US009848224B2

(12) United States Patent
Sullivan et al.

(10) Patent No.: US 9,848,224 B2
(45) Date of Patent: Dec. 19, 2017

(54) METHODS AND APPARATUS TO ESTIMATE DEMOGRAPHICS OF A HOUSEHOLD

(71) Applicant: The Nielsen Company (US), LLC, New York, NY (US)

(72) Inventors: Jonathan Sullivan, Hurricane, UT (US); Peter Lipa, Tucson, AZ (US); Michael Sheppard, Brooklyn, NY (US); Alejandro Terrazas, Santa Cruz, CA (US)

(73) Assignee: The Nielsen Company(US), LLC, New York, NY (US)

( * ) Notice: Subject to any disclaimer, the term of this patent is extended or adjusted under 35 U.S.C. 154(b) by 0 days.

(21) Appl. No.: 14/838,096

(22) Filed: Aug. 27, 2015

(65) Prior Publication Data
US 2017/0064358 A1 Mar. 2, 2017

(51) Int. Cl.
*H04H 60/32* (2008.01)
*H04N 21/258* (2011.01)
(Continued)

(52) U.S. Cl.
CPC . *H04N 21/25883* (2013.01); *H04N 21/44204* (2013.01); *H04N 21/44222* (2013.01);
(Continued)

(58) Field of Classification Search
CPC ....... H04N 21/25883; H04N 21/44204; H04N 21/44222; H04N 21/4661; H04N 21/4665; H04N 21/4667
(Continued)

(56) References Cited

U.S. PATENT DOCUMENTS 3,540,003 A  11/1970  Murphy
3,696,297 A  10/1972  Otero
(Continued)

FOREIGN PATENT DOCUMENTS

EP  0228242  8/1987
EP  0451384  10/1991
(Continued)

OTHER PUBLICATIONS

Saurabh Gupta, Pablo Arbelaez, and Jitendra Malik, "Perceptual Organization and Recognition of Indoor Scenes from RGB-D Images," Computer Vision and Pattern Recognition (CVPR), 2013 IEEE Conference (p. 564-571).
(Continued)

*Primary Examiner* — Nathan Flynn
*Assistant Examiner* — Alfonso Castro
(74) *Attorney, Agent, or Firm* — Hanley, Flight and Zimmerman, LLC

(57) ABSTRACT

Methods and apparatus to estimate demographics of a household are disclosed. An example method to determine demographics for non-panelist households includes calculating a first demographic constraint average and a second demographic constraint average based on a first demographic distribution of a first tuning event of a household and a second demographic distribution of a second tuning event of the household. The household is a non-panelist household. The example method also includes, based on the first demographic constraint average, determining a first likelihood of the household being associated with a first demographic constraint. The example method also includes, based on the second demographic constraint average, determining a second likelihood of the household being associated with a second demographic constraint. The example method also
(Continued)

includes estimating a household characteristic of the household based on the first likelihood and the second likelihood.

30 Claims, 10 Drawing Sheets

(51) Int. Cl.
   *H04N 21/442* (2011.01)
   *H04N 21/466* (2011.01)
(52) U.S. Cl.
   CPC ..... *H04N 21/4661* (2013.01); *H04N 21/4665* (2013.01); *H04N 21/4667* (2013.01)
(58) Field of Classification Search
   USPC .......................................................... 725/18
   See application file for complete search history.

(56) References Cited

U.S. PATENT DOCUMENTS

| | | |
|---|---|---|
| 3,818,458 A | 6/1974 | Deese |
| 3,906,454 A | 9/1975 | Martin |
| 4,058,829 A | 11/1977 | Thompson |
| 4,125,892 A | 11/1978 | Fukuda et al. |
| 4,166,290 A | 8/1979 | Furtman et al. |
| 4,236,209 A | 11/1980 | Lombardo, Jr. et al. |
| 4,258,386 A | 3/1981 | Cheung |
| 4,355,372 A | 10/1982 | Johnson et al. |
| 4,356,545 A | 10/1982 | West |
| 4,516,216 A | 5/1985 | Armstrong |
| 4,546,382 A | 10/1985 | McKenna et al. |
| 4,566,030 A | 1/1986 | Nickerson et al. |
| 4,603,232 A | 7/1986 | Kurland et al. |
| 4,658,290 A | 4/1987 | McKenna et al. |
| 4,695,880 A | 9/1987 | Johnson et al. |
| 4,700,378 A | 10/1987 | Brown |
| 4,706,121 A | 11/1987 | Young |
| 4,713,791 A | 12/1987 | Saluski |
| 4,718,025 A | 1/1988 | Minor et al. |
| 4,725,886 A | 2/1988 | Galumbeck et al. |
| 4,745,549 A | 5/1988 | Hashimoto |
| 4,745,559 A | 5/1988 | Willis et al. |
| 4,751,578 A | 6/1988 | Reiter et al. |
| 4,757,456 A | 7/1988 | Benghiat |
| 4,774,658 A | 9/1988 | Lewin |
| 4,792,921 A | 12/1988 | Corwin |
| 4,817,080 A | 3/1989 | Soha |
| 4,823,290 A | 4/1989 | Fasack et al. |
| 4,831,582 A | 5/1989 | Miller et al. |
| 4,845,658 A | 7/1989 | Gifford |
| 4,849,879 A | 7/1989 | Chinnaswamy et al. |
| 4,868,866 A | 9/1989 | Williams, Jr. |
| 4,887,308 A | 12/1989 | Dutton |
| 4,924,488 A | 5/1990 | Kosich |
| 4,930,011 A | 5/1990 | Kiewit |
| 4,954,699 A | 9/1990 | Coffey et al. |
| 4,958,284 A | 9/1990 | Bishop et al. |
| 4,961,132 A | 10/1990 | Uehara |
| 4,972,367 A | 11/1990 | Burke |
| 4,972,504 A | 11/1990 | Daniel, Jr. et al. |
| 4,977,455 A | 12/1990 | Young |
| 4,977,594 A | 12/1990 | Shear |
| 4,989,230 A | 1/1991 | Gillig et al. |
| 5,006,978 A | 4/1991 | Neches |
| 5,007,017 A | 4/1991 | Kobayashi |
| 5,008,929 A | 4/1991 | Olsen et al. |
| 5,019,963 A | 5/1991 | Alderson et al. |
| 5,023,907 A | 6/1991 | Johnson et al. |
| 5,023,929 A | 6/1991 | Call |
| 5,038,211 A | 8/1991 | Hallenbeck |
| 5,038,374 A | 8/1991 | Kaufman et al. |
| 5,042,027 A | 8/1991 | Takase et al. |
| 5,047,867 A | 9/1991 | Strubbe et al. |
| 5,049,873 A | 9/1991 | Robins et al. |
| 5,062,147 A | 10/1991 | Pickett et al. |
| 5,063,610 A | 11/1991 | Alwadish |
| 5,088,108 A | 2/1992 | Uddenfeldt et al. |
| 5,101,402 A | 3/1992 | Chiu et al. |
| 5,109,350 A | 4/1992 | Henwood et al. |
| 5,140,419 A | 8/1992 | Galumbeck et al. |
| 5,159,685 A | 10/1992 | Kung |
| 5,161,109 A | 11/1992 | Keating et al. |
| 5,181,113 A | 1/1993 | Chang |
| 5,210,530 A | 5/1993 | Kammerer et al. |
| 5,214,792 A | 5/1993 | Alwadish |
| 5,220,522 A | 6/1993 | Wilson et al. |
| 5,220,655 A | 6/1993 | Tsutsui |
| 5,223,827 A | 6/1993 | Bell et al. |
| 5,223,924 A | 6/1993 | Strubbe |
| 5,226,120 A | 7/1993 | Brown et al. |
| 5,231,593 A | 7/1993 | Notess |
| 5,235,680 A | 8/1993 | Bijnagte |
| 5,237,677 A | 8/1993 | Hirosawa et al. |
| 5,237,684 A | 8/1993 | Record et al. |
| 5,239,540 A | 8/1993 | Rovira et al. |
| 5,241,625 A | 8/1993 | Epard et al. |
| 5,241,671 A | 8/1993 | Reed et al. |
| 5,245,429 A | 9/1993 | Virginio et al. |
| 5,247,517 A | 9/1993 | Ross et al. |
| 5,247,575 A | 9/1993 | Sprague et al. |
| 5,247,697 A | 9/1993 | Ban |
| 5,249,260 A | 9/1993 | Nigawara et al. |
| 5,251,324 A | 10/1993 | McMullan, Jr. |
| 5,253,346 A | 10/1993 | Okabayashi et al. |
| 5,262,860 A | 11/1993 | Fitzpatrick et al. |
| 5,267,351 A | 11/1993 | Reber et al. |
| 5,276,458 A | 1/1994 | Sawdon |
| 5,281,962 A | 1/1994 | Vanden Heuvel et al. |
| 5,283,639 A | 2/1994 | Esch et al. |
| 5,297,249 A | 3/1994 | Bernstein et al. |
| 5,315,093 A | 5/1994 | Stewart |
| 5,315,580 A | 5/1994 | Phaal |
| 5,321,838 A | 6/1994 | Hensley et al. |
| 5,327,237 A | 7/1994 | Gerdes et al. |
| 5,327,554 A | 7/1994 | Palazzi, III et al. |
| 5,331,544 A | 7/1994 | Lu et al. |
| 5,333,302 A | 7/1994 | Hensley et al. |
| 5,339,239 A | 8/1994 | Manabe et al. |
| 5,347,632 A | 9/1994 | Filepp et al. |
| 5,349,662 A | 9/1994 | Johnson et al. |
| 5,351,293 A | 9/1994 | Michener et al. |
| 5,355,327 A | 10/1994 | Stent et al. |
| 5,355,484 A | 10/1994 | Record et al. |
| 5,359,367 A | 10/1994 | Stockill |
| 5,361,359 A | 11/1994 | Tajalli et al. |
| 5,367,677 A | 11/1994 | Stanfill |
| 5,374,951 A | 12/1994 | Welsh |
| 5,375,070 A | 12/1994 | Hershey et al. |
| 5,379,380 A | 1/1995 | Mori et al. |
| 5,388,211 A | 2/1995 | Hornbuckle |
| 5,388,252 A | 2/1995 | Dreste et al. |
| 5,388,258 A | 2/1995 | Larsson et al. |
| 5,390,281 A | 2/1995 | Luciw et al. |
| 5,406,569 A | 4/1995 | Isozaki |
| 5,408,607 A | 4/1995 | Nishikawa et al. |
| 5,410,598 A | 4/1995 | Shear |
| 5,412,778 A | 5/1995 | Andres |
| 5,414,809 A | 5/1995 | Hogan et al. |
| 5,461,708 A | 10/1995 | Kahn |
| 5,491,820 A | 2/1996 | Belove et al. |
| 5,495,581 A | 2/1996 | Tsai |
| 5,499,340 A | 3/1996 | Barritz |
| 5,550,928 A | 8/1996 | Lu et al. |
| 5,557,333 A | 9/1996 | Jungo et al. |
| 5,560,038 A | 9/1996 | Haddock |
| 5,568,471 A | 10/1996 | Hershey et al. |
| 5,594,911 A | 1/1997 | Cruz et al. |
| 5,600,364 A | 2/1997 | Hendricks et al. |
| 5,604,867 A | 2/1997 | Harwood |
| 5,608,445 A | 3/1997 | Mischler |
| 5,615,264 A | 3/1997 | Kazmierczak et al. |
| 5,623,652 A | 4/1997 | Vora et al. |
| 5,648,965 A | 7/1997 | Thadani et al. |

(56) References Cited

U.S. PATENT DOCUMENTS

| | | |
|---|---|---|
| 5,671,283 A | 9/1997 | Michener et al. |
| 5,696,702 A | 12/1997 | Skinner et al. |
| 5,708,780 A | 1/1998 | Levergood et al. |
| 5,710,918 A | 1/1998 | Lagarde et al. |
| 5,715,453 A | 2/1998 | Stewart |
| 5,717,923 A | 2/1998 | Dedrick |
| 5,724,521 A | 3/1998 | Dedrick |
| 5,732,218 A | 3/1998 | Bland et al. |
| 5,737,619 A | 4/1998 | Judson |
| 5,740,549 A | 4/1998 | Reilly et al. |
| 5,787,253 A | 7/1998 | McCreery et al. |
| 5,796,952 A | 8/1998 | Davis et al. |
| 5,801,747 A | 9/1998 | Bedard |
| 5,819,156 A | 10/1998 | Belmont |
| 5,819,285 A | 10/1998 | Damico et al. |
| 5,829,001 A | 10/1998 | Li et al. |
| 5,835,923 A | 11/1998 | Shibata et al. |
| 5,848,396 A | 12/1998 | Gerace |
| 5,857,190 A | 1/1999 | Brown |
| 5,872,588 A | 2/1999 | Aras et al. |
| 5,878,384 A | 3/1999 | Johnson et al. |
| 5,892,917 A | 4/1999 | Myerson |
| 5,931,912 A | 8/1999 | Wu et al. |
| 5,933,811 A | 8/1999 | Angles et al. |
| 5,935,207 A | 8/1999 | Logue et al. |
| 5,948,061 A | 9/1999 | Merriman et al. |
| 5,951,643 A | 9/1999 | Shelton et al. |
| 5,958,010 A | 9/1999 | Agarwal et al. |
| 5,963,914 A | 10/1999 | Skinner et al. |
| 5,964,839 A | 10/1999 | Johnson et al. |
| 5,991,735 A | 11/1999 | Gerace |
| 6,005,597 A | 12/1999 | Barrett et al. |
| 6,014,638 A | 1/2000 | Burge et al. |
| 6,018,619 A | 1/2000 | Allard et al. |
| 6,052,730 A | 4/2000 | Felciano et al. |
| 6,070,145 A | 5/2000 | Pinsley et al. |
| 6,108,637 A | 8/2000 | Blumenau |
| 6,112,238 A | 8/2000 | Boyd et al. |
| 6,112,240 A | 8/2000 | Pogue et al. |
| 6,115,742 A | 9/2000 | Franklin et al. |
| 6,138,155 A | 10/2000 | Davis et al. |
| 6,167,358 A | 12/2000 | Othmer et al. |
| 6,173,311 B1 | 1/2001 | Hassett et al. |
| 6,250,930 B1 | 6/2001 | Mintz |
| 6,275,854 B1 | 8/2001 | Himmel et al. |
| 6,278,966 B1 | 8/2001 | Howard et al. |
| 6,279,036 B1 | 8/2001 | Himmel et al. |
| 6,279,112 B1 | 8/2001 | O'Toole, Jr. et al. |
| 6,317,787 B1 | 11/2001 | Boyd et al. |
| 6,324,546 B1 | 11/2001 | Ka et al. |
| 6,360,261 B1 | 3/2002 | Boyd et al. |
| 6,393,479 B1 | 5/2002 | Glommen et al. |
| 6,397,359 B1 | 5/2002 | Chandra et al. |
| 6,408,335 B1 | 6/2002 | Schwaller et al. |
| 6,418,470 B2 | 7/2002 | Blumenau |
| 6,449,604 B1 | 9/2002 | Hansen et al. |
| 6,457,010 B1 | 9/2002 | Eldering et al. |
| 6,466,970 B1 | 10/2002 | Lee et al. |
| 6,601,100 B2 | 7/2003 | Lee et al. |
| 6,621,881 B2 | 9/2003 | Srinivasan |
| 6,625,648 B1 | 9/2003 | Schwaller et al. |
| 6,662,195 B1 | 12/2003 | Langseth et al. |
| 6,662,227 B2 | 12/2003 | Boyd et al. |
| 6,671,715 B1 | 12/2003 | Langseth et al. |
| 6,684,194 B1 | 1/2004 | Eldering et al. |
| 6,714,917 B1 | 3/2004 | Eldering et al. |
| 6,766,370 B2 | 7/2004 | Glommen et al. |
| 6,859,833 B2 | 2/2005 | Kirsch et al. |
| 7,150,030 B1 | 12/2006 | Eldering et al. |
| 7,260,823 B2 | 8/2007 | Schlack et al. |
| 7,376,722 B1 | 5/2008 | Sim et al. |
| 7,730,509 B2 | 6/2010 | Boulet et al. |
| 7,890,451 B2 | 2/2011 | Cancel et al. |
| 8,401,979 B2 | 3/2013 | Zhang et al. |
| 8,412,648 B2 | 4/2013 | Karypis et al. |
| 8,453,173 B1 | 5/2013 | Anderson et al. |
| 8,543,523 B1 | 9/2013 | Palit et al. |
| 8,607,267 B2 | 12/2013 | Shkedi |
| 8,839,291 B1 | 9/2014 | Anderson et al. |
| 8,984,547 B2 | 3/2015 | Lambert et al. |
| 2002/0040394 A1 | 4/2002 | Shapira |
| 2002/0040395 A1 | 4/2002 | Davis et al. |
| 2002/0077787 A1 | 6/2002 | Rappaport et al. |
| 2002/0078191 A1 | 6/2002 | Lorenz |
| 2002/0099812 A1 | 7/2002 | Davis et al. |
| 2002/0103664 A1 | 8/2002 | Olsson et al. |
| 2002/0112048 A1 | 8/2002 | Gruyer et al. |
| 2002/0161673 A1 | 10/2002 | Lee et al. |
| 2003/0046303 A1 | 3/2003 | Chen et al. |
| 2003/0046385 A1 | 3/2003 | Vincent |
| 2003/0110485 A1 | 6/2003 | Lu et al. |
| 2003/0144868 A1 | 7/2003 | MacIntyre et al. |
| 2003/0163563 A1 | 8/2003 | Bean |
| 2003/0187677 A1 | 10/2003 | Malireddy et al. |
| 2003/0231203 A1 | 12/2003 | Gallella |
| 2004/0193488 A1* | 9/2004 | Khoo ................ G06Q 30/02 705/14.52 |
| 2004/0221033 A1 | 11/2004 | Davis et al. |
| 2005/0114511 A1 | 5/2005 | Davis et al. |
| 2006/0075421 A1 | 4/2006 | Roberts et al. |
| 2006/0168613 A1 | 7/2006 | Wood et al. |
| 2008/0256235 A1 | 10/2008 | Or Sim et al. |
| 2008/0263200 A1 | 10/2008 | Or Sim et al. |
| 2008/0275755 A1 | 11/2008 | Brustein et al. |
| 2008/0300965 A1* | 12/2008 | Doe ................ G06Q 30/0204 705/7.33 |
| 2010/0057525 A1 | 3/2010 | Wagner et al. |
| 2010/0228855 A1 | 9/2010 | Sim et al. |
| 2011/0004682 A1 | 1/2011 | Honnold et al. |
| 2015/0081604 A1* | 3/2015 | Duque ............ H04L 29/06462 706/12 |

FOREIGN PATENT DOCUMENTS

| | | |
|---|---|---|
| EP | 0632382 | 6/1993 |
| EP | 0747841 | 12/1996 |
| WO | 9826529 | 6/1998 |
| WO | 2004088457 | 10/2004 |
| WO | 2004088457 A2 | 10/2004 |

OTHER PUBLICATIONS

Saurabh Gupta, Pablo Arbelaez, and Jitendra Malik, "Perceptual Organization and Recognition of Indoor Scenes from RGB-D Images," Jun. 2013, 8 pages, Berkley, CA.

Consoli, John, http://www.mediaweek.com, Nielsen Unveils NationalTV/Internet Fusion, internet article, Nov. 1, 2006, 2 pages.

http://www.arbitronratings.com, Respondent-Level Data: Your Key to Reaching the Hispanic Listener, internet article, 2007, 2 pages.

Zvi Gilula, Robert E. McCulloch, and Peter E. Rossi, "A Direct Approach to Data Fusion," Journal of Marketing Research vol. XLIII, Feb. 2006, 22 pages.

International Searching Authority, "International Search Report," for International application No. PCT/2008/059874, dated Mar. 2, 2009, 3 pages.

International Searching Authority, "Written Opinion," for International application No. PCT/2008/059874, dated Mar. 2, 2009, 5 pages.

IP Australia, "Notice of Acceptance,", issued in connection with Australian application serial No. 2008260397, dated Aug. 7, 2012, 2 pages.

United Kingdom Intellectual Property Office, "Examination Report" issued for GB0920943.8, dated Nov. 10, 2010, 6 pages.

United Kingdom Intellectual Property Office, "Examination Report," issued in GB Application No. 0920943.8, dated Apr. 11, 2011, 5 pages.

International Bureau, "International Preliminary Report on Patentability," issued for PCT/US2008/059874, dated Dec. 10, 2009, 7 pages.

(56) References Cited

OTHER PUBLICATIONS

United States Patent and Trademark Office, "Notice of Allowance," issued in connection with U.S. Appl. No. 12/100,698 dated Feb. 25, 2011, 12 pages.

United States Patent and Trademark Office, "Notice of Allowance," issued in connection with U.S. Appl. No. 09/763,338 dated Jan. 2, 2008, 7 pages.

Schmittlein, David C., Marketing Science: "Why does the NBD Model Work?," vol. 4, No. 3, Summer 1985, 1 page.

Ziegler, B., The Wall St. J., "Start up NetCount Seeks to Tally How Many Web Surfers See Ads," Oct. 1996, pp. B17, 2 pages.

Japanese Patent Office, "Office Action", in connection with Japanese Patent Application No. 2001-516087, dated May 18, 2010, 14 pages.

Japanese Patent Office, "Office Action," in connection with Japanese Patent Application No. 2001-516087, dated Jan. 25, 2011, 8 pages.

United States Patent and Trademark Office, "Non-Final Office Action," in connection with U.S. Appl. No. 12/100,685 dated Feb. 12, 2009, 20 pages.

United States Patent and Trademark Office, "Final Office Action," in connection with U.S. Appl. No. 12/100,685, dated Nov. 16, 2009, 69 pages.

United States Patent and Trademark Office, "Notice of Allowance," issued in connection with U.S. Appl. No. 12/100,698, dated Oct. 20, 2010, 11 pages.

"PC-Meter Tracks Computer Uses" (Oct. 2, 1995), Advertising Age (4 pages).

Digital Envoy, Inc., NetAcuity IP Intelligence Whitepaper, "The Role of IP Intelligence in the Online World", Digital Envoy, 2002, Copyright 2002-2003 (10 pages).

David M. Hilbert, et al. "Agents for Collecting Application Usage Data Over the Internet", Department of Information and Computer Science, University of California, 1998 (9 pages).

Louis Desjardins, (1994) "Activity Monitor 1.1, User's Guide" (5 pages).

Michael A. Abrams"A Tool to Aid in Model Development and Validation", Systems Engineering—Retail Division, NCR Corporation, Annual Simulation Symposium, 1986, 10 pages.

Joseph K.W. Lee, et al. (1997) "Intelligent Agents for Matching Information Providers and Consumers on the World-Wide-Web", Department of Computer Science, The University of Hong Kong, 11 pages.

Bamshad Mobasher, (1997) "Association Rules," http://maya.cs.depaul.edu/-mobasher/webminerlsurvey/node15.html, 1 page.

Bamshad Mobasher, (1997) "Sequential Patterns," http://maya.cs.depaul.edu/-mobasher/webminerlsurvey/node16.html, 1 page.

Bamshad Mobasher, (1997) "Clustering and Classification," http://maya.cs.depaul.edu/-mobasher/webminerlsurvey/node17.html, 1 page.

Bamshad Mobasher, (1997) "Analysis of Discovered Patterns," http://maya.cs.depaul.edu/-mobasher/webminerlsurvey/node18.html, 1 page.

Bamshad Mobasher, (1997) "Visualization Techniques," http://maya.cs.depaul.edu/-mobasher/webminerlsurvey/node19.html, 1 page.

Bamshad Mobasher, (1997) "Web Usage Mining Architecture," http://maya.cs.depaul.edu/-mobasher/webminerlsurvey/node23.html, 3 pages.

Bamshad Mobasher, (1997) "Analysis of Mined Knowledge," http://maya.cs.depaul.edu/-mobasher/webminer/survey/node27.html, 1 page.

About, Inc., tcpslice-Linux Command-Unix Command, "Focus on Linux," http://linux.about.com/library/cmdlblcmdl8_tcpslicxe.htm, Retrieved Jun. 12, 2006, 3 pages.

Paul Weiler, et al., (94) "Usability Lab Tools: One Year Later", CHI 94, Celebrating Independence, Conference Companion, 1994, 1 page.

Matt Wright, "Matt's Script Archive: Book'em Dano" (1996), 2 pages.

Prakash Baskaran, (1996) "Gamelan Who's Who More Info", http://web.archive.org/web/19961027024909 1www.gamelan.com/person.cgi?id=PB3, 2 page.

Stephen E. Hansen, et al. (Nov. 1993) "Automated System Monitoring and Notification with Swatch", LISA, 9 pages.

BUBL Administrator, Gwstat v1.1—generate graphs of httpd server traffic, public release 1994, http://www.bubl.ac.ukll/archive/interneVwwwservers/hwstat6.htm, printed on Jun. 12, 2006, 1 page.

Jon Finke (Sep. 19-23, 1994) "Monitoring Usage of Workstations with a Relational Database", LISA, 10 pages.

James E. Pitkow, et al. (1994) "A Simple Yet Robust Caching Algorithm Based on Dynamic Access Patterns", Graphics, Visualization & Usability Center College of Computing, Georgia Institute of Technology, 8 pages.

Arlitt et al., Internet Web Servers: Workload Characterization and Performance Implications, IEEE/ACM Transactions on Networking, vol. 5, No. 5, Oct. 1997, 15 pages.

Bertot et al., Web Usage Statistics: Measurement Issues and Analytical Techniques, Government Information Quarterly, 1997, vol. 14, No. 4, pp. 373-395, 23 pages.

Montgomery, Using Clickstream Data to Predict WWW Usage, Aug. 1999, 27 pages.

Naor et al., Secure Accounting and Auditing on the Web, Computer Networks and ISDN Systems 30, 1998, pp. 541-550, 10 pages.

Padmanabhan et al., Analysis of Web Site Usage Data: How Much Can We Learn About the Consumer from Web Logfiles?, Working Paper IS-96-18, Dec. 1996, 33 pages.

Shahabi et al., Knowledge Discovery from Users Web-Page Navigation, 1997, 11 pages.

Zaiane et al., Discovering Web access patterns and trends by applying OLAP and data mining technology on Web logs, Research and Technology Advances in Digital Libraries, Apr. 1998, 12 pages.

Cooley et al., Data Preparation for Mining World Wide Web Browsing Patterns, 1999, 27 pages.

Cooper, Design Considerations in Instrumenting and Monitoring Web-Based Information Retrieval Systems, Journal of the American Society for Information Science. 49(10):903-919, 1998, 17 pages.

Crovella et al., Self-Similarity in World Wide Web Traffic, 1999, 25 pages.

Mulvenna et al., The 'Soft-Push': Mining Internet Data for Marketing Intelligence, 1997, 20 pages.

Seshan et al., Spand: Shared Passive Network Performance Discovery, Dec. 1997, 13 pages.

Pierrakos et al., Web Usage Mining as a Tool for Personalization: A Survey, 2003, 62 pages.

Gotta et al., Performance Evaluation of Web Applications, 1998, 19 pages.

David Beckett, "Combined Log System", [1] Computing Laboratory, http://www.igd.fhg.de/archive/1995_www95/papers/46/comblog.html, printed on May 24, 2006, pp. 1-8, 8 pages.

Logging Control in W3C httpd, generic statistics programs that analyze log file contents, http://www.w3.orglDaemon/User/Config/Logging.html, printed on May 24, 2006, pp. 1-3, 3 pages.

Extended Log File Format W3C Working Draft WD-logfile-960323, http://www.w3.org/TRIWD-logfile.html, printed on May 24, 2006, pp. 1-6, 6 pages.

Order Counter.html history, Order History of Changes, http://www.ualberta.ca/GEO/Counter.History.html, printed on May 24, 2006, pp. 1-8, 8 pages.

Tim Berners-Lee, Cern (Mar. 1989 and May 1990) "Information Management: A Proposal", http://www.w3.org.History/1989.proposal.html, printed on May 24, 2006, pp. 1-14, 14 pages.

Robert Cooley, et al. "Web Mining: Information and Pattern Discovery on the World Wide Web", Department of Computer Science University of Minnesota, Jul. 16, 1997 (2 pages).

Bamshad Mobasher (1997) Introduction, Next: A taxonomy of up: Web Mining: Information and Previous:Web Mining: Information and . . . , http://maya.cs.edpaul.edu/-mobasher/webminer/survey/node1.html (2 pages).

Bamshad Mobasher (1997) A Taxonomy of Web Mining: Next: Web Content Mining Up: Web Mining: Information and Previous: Introduction, http://maya.cs.edpaul.edu/-mobasher/webminerlsurvey/node2.html (2 pages).

(56) References Cited

OTHER PUBLICATIONS

Bamshad Mobasher (1997) Content Mining: Next: Agent-Based Approach Up: A Taxonomy of Previous: A taxonomy of, http://maya.cs.edpaul.edu/-mobasher/webminerlsurvey/node3.html (2 pages).

Bamshad Mobasher (1997) Agent-Based Approach: Next Database Approach Up: Web Content Mining Previous: Web Content Mining, http://maya.cs.edpaul.edu/-mobasher/webminerlsurvey/node4.html (2 pages).

Bamshad Mobasher (1997) Database Approach: Next: Web Usage Mining Up: Web Content Mining Previous: Agent-Based Approach, http://maya.cs.edpaul.edu/-mobasher/webminerlsurvey/node5.html, (4 pages).

Bamshad Mobasher (1997) Web Usage Mining: Next: Pattern Discovery Tools Up: A Taxonomy of Previous: Database Approach, http://maya.cs.edpaul.edu/-mobasher/webminerlsurvey/node6.html (5 pages).

Bamshad Mobasher (1997) Pattern Discovery Tools: Next: Pattern Analysis Tools Up: Web Usage Mining Previous: Web Usage Mining, http://maya.cs.edpaul.edu/-mobasher/webminerlsurvey/node7.html (1 page).

Bamshad Mobasher (1997) Pattern Analysis Tools: Next: Pattern Discovery from Up: Web Usage Mining Previous: Pattern Discovery Tool, http://maya.cs.edpaul.edu/-mobasher/webminerlsurvey/node8.html (1 page).

Bamshad Mobasher (1997) Pattern Discovery from Web Transactions: Next: Preprocessing Tasks Up: Web Mining: Information and Previous: Pattern Analysis Tools, http://maya.cs.edpaul.edu/-mobasher/webminerlsurvey/node9.html (1 page).

Bamshad Mobasher (1997) Preprocessing Tasks, Next: Data Cleaning Up: Pattern Discovery from Previous: Pattern Discovery from . . . , http://maya.cs.edpaul.edu/-mobasher/webminerlsurvey/node1 O.html (1 page).

Bamshad Mobasher (1997) Data Cleaning, Next: Transaction Identification Up: Preprocessing Tasks, http://maya.cs.edpaul.edu/-mobasher/webminer/survey/node11.html (12 pages).

United States Patent and Trademark Office, "Non Final Office Action," issued in connection with U.S. Appl. No. 12/100,698, dated Jan. 20, 2010 (18 pages).

United States Patent and Trademark Office, "Non Final Office Action," issued in connection with U.S. Appl. No. 12/100,698, dated Sep. 25, 2009 (17 pages).

United States Patent and Trademark Office, "Final Office Action," issued in connection with U.S. Appl. No. 09/763,338, dated Jul. 12, 2007 (21 pages).

United States Patent and Trademark Office, "Non Final Office Action," issued in connection with U.S. Appl. No. 09/763,338, dated Nov. 21, 2006 (22 pages).

United States Patent and Trademark Office, "Requirement for Restriction/Election," issued in connection with U.S. Appl. No. 09/763,338, dated Aug. 1, 2006 (6 pages).

United States Patent and Trademark Office, "Notice of Allowance," issued in connection with the U.S. Appl. No. 12/100,698, filed Apr. 10, 2008 (12 pages).

The Nielsen Company (US) LLC., "Complaint for Patent Infringement," filed with the United States District Court for the Eastern District of Virginia Alexandria Division and transferred to the Norfolk Division on Mar. 15, 2011 (13 pages).

United States Patent and Trademark Office, "Notice of Allowance," issued in connection with the U.S. Appl. No. 12/780,890, filed Mar. 22, 2011 (21 pages).

United States Patent and Trademark Office, "Non Final Rejection," issued in connection with the U.S. Appl. No. 12/780,890, filed Oct. 1, 2010 (9 pages).

United States Patent and Trademark Office, "Non Final Rejection," issued in connection with the U.S. Appl. No. 13/098,358, filed Jul. 27, 2011 (10 pages).

\* cited by examiner

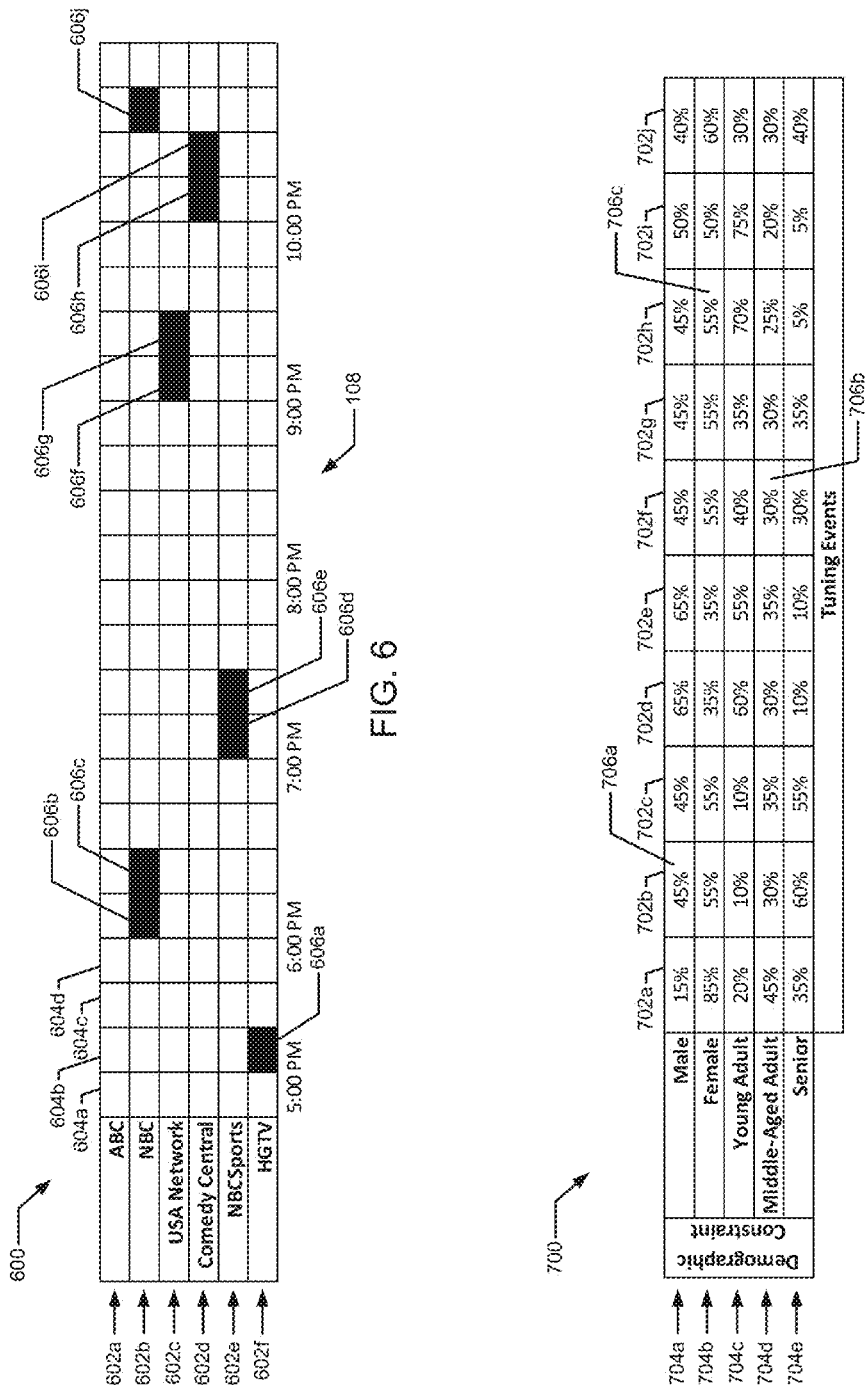

US 9,848,224 B2

METHODS AND APPARATUS TO ESTIMATE DEMOGRAPHICS OF A HOUSEHOLD

FIELD OF THE DISCLOSURE

This disclosure relates generally to audience measurement, and, more particularly, to estimating demographics of a household.

BACKGROUND

Traditionally, audience measurement entities enlist panelist households to participate in measurement panels. Members of the panelist households consent to provide demographics data (e.g., gender and age) to the audience measurement entities and to allow the audience measurement entities to collect viewing data (e.g., exposure to media such as television programming, advertising, movies, etc.) of the panelist household members. To identify the media that is exposed to the panelist household members, the audience measurement entities often employ meters (e.g., personal people meters) that monitor media presentation devices (e.g., televisions, computers, etc.) of the panelist household.

Audience measurement entities may also collect tuning data from set-top boxes of panelist households and/or non-panelist households. For example, set-top boxes may record tuning data that is associated with tuning events of the set-top box (e.g., turning a set-top box on or off, changing a channel, changing a volume), and the audience measurement entities may associate the collected tuning data with information associated with the household at which the set-top box is located.

BRIEF DESCRIPTION OF THE DRAWINGS

FIG. 6 illustrates example tuning data that is collected from the example set-top box of the household of FIG. 1.

FIG. 7 illustrates example demographic distributions of panelist households associated with the example collected tuning data of FIG. 6.

Wherever possible, the same reference numbers will be used throughout the drawing(s) and accompanying written description to refer to the same or like parts.

DETAILED DESCRIPTION

Figure 1:
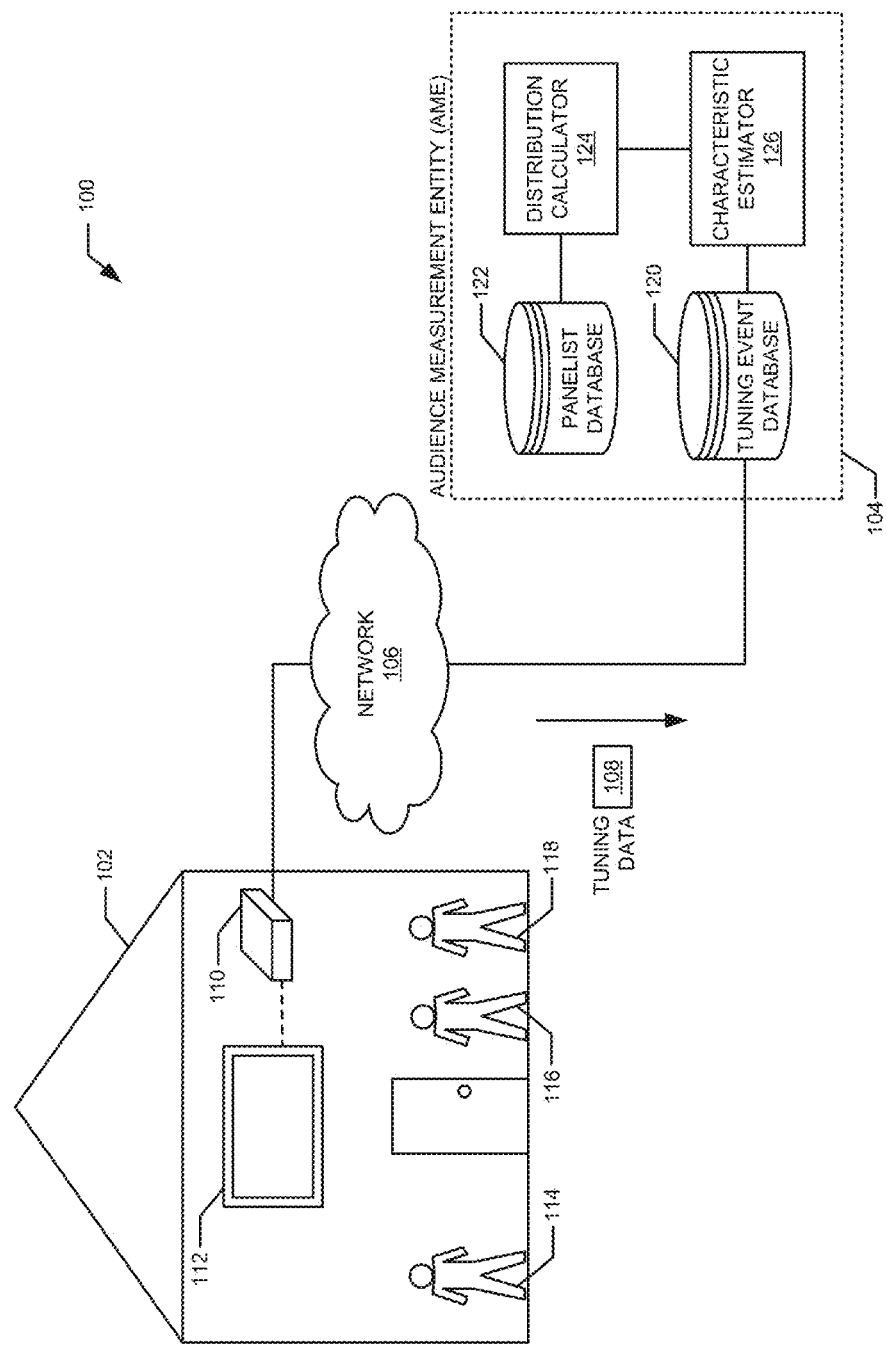
FIG. 1 is a block diagram of an example environment in which tuning data of a household is collected and analyzed to estimate a household characteristic of the household.

Example methods and apparatus disclosed herein estimate demographics of a household based on tuning data collected from the household and demographics and consumption data collected from panelist households.

Audience measurement entities (AMEs) measure a composition and size of audiences consuming media to produce ratings of the media. Ratings may be used by advertisers and/or marketers to purchase advertising space and/or design advertising campaigns. Additionally, media producers and/or distributors may use the ratings to determine how to set prices for advertising space and/or to make programming decisions. To measure the composition and size of an audience, AMEs (e.g., The Nielsen Company (US), LLC®) track audience members' exposure to media and associate demographics data, demographics information and/or demographics of the audience members (e.g., age, gender, race, education level, income, etc.) with the exposed media. Demographics data of an audience member and/or an audience associated with exposed media may include a plurality of characteristics of the audience member and/or audience.

As used herein, a demographic characteristic in demographics data is referred to as a "demographic dimension." For example, demographic dimensions may include age, gender, age and gender, income, race, nationality, geographic location, education level, religion, etc. A demographic dimension may include, be made up of and/or be divided into different groupings.

As used herein, each grouping of a demographic dimension is referred to as a "demographic marginal" (also referred to herein as a "demographic group" and/or a "demographic bucket"). For example, a "gender" demographic dimension includes a "male" demographic marginal and a "female" demographic marginal.

As used herein, a "demographic constraint" represents a demographic marginal or a combination of independent demographic marginals of interest (e.g., joint marginals or distributions, demographic marginals of different demographic dimensions). An example demographic constraint includes a combination of a marginal from a race demographic dimension, a marginal from an "age/gender" demographic dimension, and a marginal from an "education level" demographic dimension (e.g., a Latina, 18-45 year-old male, and a master's degree).

To obtain demographics data of audience members and associate exposed media with demographics data of its audience, AMEs may enlist panelist households to participate in measurement panels. Media exposure and/or demographics data associated with the panelist households may be collected and may be used to project a size and demographic makeup of a population. Members of the panelist households provide demographics data to the AMEs via, for example, self-reporting to the AMEs, responses to surveys, consenting to the AMEs obtaining demographics data from database proprietors (e.g., Facebook, Twitter, Google, Yahoo!, MSN, Apple, Experian, etc.), etc.

Members of panelist households consent to AMEs collecting consumption data by measuring exposure of the panelist households to media (e.g., television programming, radio programming, online content, programs, advertising, etc.). As used herein, "consumption data" refers to information pertaining to media exposure events presented via a media presentation device (e.g., a television, a stereo, a speaker, a computer, a portable device, a gaming console, an online media presentation device, etc.) of a household (e.g., a panelist household) and associated with a person and/or a group of persons of the household (e.g., panelist(s), member(s) of the panelist household). For example, consumption data includes information indicating that a panelist is exposed to particular media if the panelist is present in a room in which the media is being presented. To enable the AMEs to collect such consumption data, the AMEs typically provide panelist households with meter(s) that monitor media presentation devices (e.g., televisions, stereos, speakers, computers, portable devices, gaming consoles, and/or online media presentation devices, etc.) of the household.

Enlisting and retaining panelists for audience measurement can be a difficult and costly process for AMEs. For example, AMEs must carefully select and screen panelist households for particular characteristics so that a population of the panelist households is representative of the population as a whole. Further, panelist household members must diligently perform specific tasks to enable the collected demographics and consumption data to accurately reflect the panelist household. For example, to identify that a panelist is consuming a particular media, the AMEs may require the panelist to interact with a meter (e.g., a people meter) that monitors media presentation devices of the panelist household. A people meter is an electronic device that is typically positioned in a media access area (e.g., a consumption area such as a living room of the panelist household) and is proximate to and/or carried by one or more panelists. In some examples, the panelist must physically interact with the meter. For example, based on one or more triggers (e.g., a channel change of a media presentation device or an elapsed period of time), the people meter may generate a prompt for audience members of the panelist household to provide presence and/or identity information by depressing a button of the people meter. Although periodically inputting information in response to a prompt may not be burdensome when required for a short period of time, some people find the prompting and data input tasks to be intrusive and annoying over longer periods of time. As a result, some households that are otherwise desirable for AMEs elect not to be a panelist household.

Because collecting information from panelist households can be difficult and costly, AMEs and other entities interested in measuring media/audiences have begun to collect information from other sources such as set-top boxes and/or over-the-top devices (e.g., a Roku media device, an Apple TV media device, a Samsung TV media device, a Google TV media device, a Chromecast media device, an Amazon TV media device, a gaming console, a smart TV, a smart DVD player, an audio-streaming device, etc.). A set-top box (STB) is a device that converts source signals into media presented via a media presentation device. In some examples, the STB implements a digital video recorder (DVR) and/or a digital versatile disc (DVD) player. Further, some STBs are capable of recording tuning data of corresponding media presentation devices. As used herein, "tuning data" refers to information pertaining to tuning events (e.g., a STB being turned on or off, channel changes, volume changes, tuning duration times, etc.) of a STB and/or a media presentation device of a household that is not associated with demographics data (e.g., number of household members, age, gender, race, etc.) of the household and/or members of the household. To collect the tuning data of a STB, consent is often obtained from the household for such data acquisition (e.g., via a third-party media provider and/or manufacturer, the AME, etc.). Many households are willing to provide tuning data via a STB, because personalized information is not collected by the STB and repeated actions are not required of the household members. As used herein, households that consent to collection of tuning data (e.g., via a STB), but do not consent to collection of consumption data (e.g., media exposure data that is tied to a particular person such as a panelist) and/or demographics data, are referred to as "non-panelist households." While collecting data from non-panelist households can greatly increase the amount collected data about media exposure, the lack of consumption data and demographic data reduces the value of this media exposure data.

To increase the value of tuning data collected from non-panelist households in measuring the composition and size of audiences consuming media, methods and apparatus disclosed herein enable AMEs (or any other entity) to associate the tuning data of the non-panelist households with demographics data of its household members. As disclosed herein, to predict or estimate a household characteristic (e.g., a demographic composition such as a number of household members and demographics of the household members, media presentation device characteristics such as a number of television sets within the household and locations of the televisions within the household, etc.) of a non-panelist household, tuning data collected from the non-panelist household (e.g., via a STB) is compared with consumption data and demographics data collected from panelist households (e.g., via people meters).

As used herein, a "household characteristic" refers to a characteristic of a household and/or a characteristic of a member of the household. Example household characteristics include a number of household members, demographics of the household members, a number of television sets within the household, locations of the respective televisions within the household, etc.).

As used herein, groupings within a characteristic (e.g., a household characteristic) are referred to as "household features," "features" or "predictors." Example features include demographic constraints (e.g., a "male" feature, an "18-45 year-old, male" feature, etc.), groupings of a "number of household members" household characteristic (e.g., a "one-member household" feature, a "two-member household" feature), groupings of a "number of television sets" household characteristic (e.g., a "one-television household" feature, a "two-television household" feature, etc.), and groupings of a "television location" household characteristic (e.g., a "living room" feature, a "bedroom" feature, etc.).

The collected tuning data includes tuning events that indicate a particular channel was tuned by a STB of the non-panelist household at a particular time. The AME collects a demographic distribution of panelists who consumed the same media as that associated with the tuning event of non-panelist household. A demographic distribution identifies a count or percentage of how many panelists that consumed the same media are of particular demographic constraints of interest. Based on (1) the demographic distributions associated with the tuning events of the non-panelist household and (2) demographic distributions associated with consumption events of the panelist households, a demographic score (e.g., a ratio) is calculated for the demographic constraints of interest. The ratio or score represents a comparison of how each demographic constraint is represented for the tuning events of the non-panelist household relative to random consumption events. For example, a higher score for a particular demographic marginal corresponds to a higher likelihood that the non-panelist household includes a member of that particular demographic marginal.

Upon calculating the ratios for the constraint of interest, machine learning (e.g., in the form of decision trees, decision tree ensembles, support vector machines, neural networks, etc.) is utilized to estimate or predict household characteristics (e.g., demographics, media presentation device characteristics, etc.) of the non-panelist household. For example, decision tree ensembles that are associated with respective household features of interest may be utilized to predict the household characteristics of the non-panelist household.

When analyzing the provided input, each decision tree ensemble determines a score that indicates a likelihood of the corresponding household feature being present in the non-panelist household. Based on the scores of the decision tree ensembles, the AME is able to estimate household characteristics of the non-panelist household (e.g., a number of members of the non-panelist household, demographics of each of the members, a number of television sets in the non-panelist household, a location of each of the television sets, etc.).

Disclosed example methods to determine demographics for non-panelist households include calculating a first demographic constraint average and a second demographic constraint average based on a first demographic distribution of a first tuning event of a household and a second demographic distribution of a second tuning event of the household. The household is a non-panelist household. The first demographic distribution includes a probability that the first tuning event is associated with a first demographic constraint and a probability that the first tuning event is associated with a second demographic constraint. The second demographic distribution includes a probability that the second tuning event is associated with the first demographic constraint and a probability that the second tuning event is associated with the second demographic constraint. The example methods also include, based on the first demographic constraint average, determining a first likelihood of the household being associated with the first demographic constraint. The example methods also include, based on the second demographic constraint average, determining a second likelihood of the household being associated with the second demographic constraint. The example methods also include estimating a household characteristic of the household based on the first likelihood and the second likelihood.

In some example methods, estimating the household characteristic includes estimating a number of televisions within the household and a location of a television within the household.

In some example methods, estimating the household characteristic includes estimating a number of household members of the household and a demographic of a household member. In some such examples methods, estimating the demographic of the household member includes determining a marginal of a demographic dimension for the household member. The demographic dimension includes the first demographic constraint and the second demographic constraint.

In some example methods, determining the first likelihood includes dividing the first demographic constraint average of the household by a first constraint probability of an average demographic distribution for consumption events of panelist households, and determining the second likelihood includes dividing the second demographic constraint average of the household by a second constraint probability of the average demographic distribution.

In some example methods, estimating the household characteristic of the household is further based on at least one of the first and second demographic constraints, a total number of minutes consumed by the household, and a number of minutes consumed by the household per predetermined time-period segments.

Some example methods include calculating a score vector based on the first likelihood and the second likelihood. The score vector is to be applied to a machine learning classifier to estimate the household characteristic. In some such example methods, the machine learning classifier is a decision tree ensemble. Some such example methods include training the decision tree ensemble on consumption data of a first panelist household and testing the decision tree ensemble on consumption data of a second panelist household. The second panelist household is different than the first panelist household.

In some example methods, estimating the household characteristic of the household includes identifying whether at least one of the first likelihood and the second likelihood is equal to or greater than a threshold value.

Disclosed example apparatus to determine demographics for non-panelist households include a score calculator to calculate a first demographic constraint average and a second demographic constraint average based on a first demographic distribution of a first tuning event of a household and a second demographic distribution of a second tuning event of the household. The household is a non-panelist household. The first demographic distribution includes a probability that the first tuning event is associated with a first demographic constraint and a probability that the first tuning event is associated with a second demographic constraint. The second demographic distribution includes a probability that the second tuning event is associated with the first demographic constraint and a probability that the second tuning event is associated with the second demographic constraint. The score calculator, based on the first demographic constraint average, is to determine a first likelihood of the household being associated with the first demographic constraint. The score calculator, based on the second demographic constraint average, is to determine a second likelihood of the household being associated with the second demographic constraint. The example apparatus also includes a household estimator to estimate a household characteristic of the household based on the first likelihood and the second likelihood.

In some example apparatus, to estimate the household characteristic of the household, the household estimator is to estimate a number of televisions within the household and a location of a television within the household.

In some example apparatus, to estimate the household characteristic of the household, the household estimator is to estimate a number of household members of the household and a demographic of a household member. In some such example apparatus, to estimate the demographic of the household member, the household estimator is to determine a marginal of a demographic dimension for the household member. The demographic dimension includes the first demographic constraint and the second demographic constraint.

In some example apparatus, to determine the first likelihood, the score calculator is to divide the first demographic constraint average of the household by a first constraint probability of an average demographic distribution for consumption events of panelist households. To determine the second likelihood, the score calculator is to divide the second demographic constraint average of the household by a second constraint probability of the average demographic distribution.

In some example apparatus, the household estimator is to estimate the household characteristic of the household further based on at least one of the first and second demographic constraints, a total number of minutes consumed by the household, and a number of minutes consumed by the household per predetermined time-period segments.

In some example apparatus, the score calculator is to calculate a score vector based on the first likelihood and the second likelihood and the household estimator is to apply the score vector to a machine learning classifier to estimate the household characteristic of the household. In some such example apparatus, the machine learning classifier is a decision tree ensemble. Some such example apparatus include a decision tree trainer to train the decision tree ensemble on consumption data of a first panelist household and test the decision tree ensemble on consumption data of a second panelist household. The second panelist household is different than the first panelist household.

In some example apparatus, to estimate the household characteristic of the household member, the household estimator is to identify whether at least one of the first likelihood and the second likelihood is equal to or greater than a threshold value.

FIG. 1 is a block diagram of an example environment 100 that includes a household 102, an AME 104, and a network 106. In the example environment 100, the AME 104 predicts and/or estimates household characteristics (e.g., demographic characteristics) of the household 102 (e.g., a non-panelist household). The network 106 of the illustrated example connects, among other things, the household 102 and the AME 104. The AME 104 of the illustrated example collects tuning data 108 associated with the household 102. The AME 104 processes the tuning data 108 to determine estimated household characteristics for the household 102. In the illustrated example, the example AME 104 estimates demographic characteristics of the household 102 to estimate a composition and/or size of an audience consuming media (e.g., television programming, advertising, movies, etc.) to produce media ratings.

The AME 104 (e.g., The Nielsen Company (US), LLC®) of the illustrated example produces ratings of media by measuring a composition and/or size of audiences consuming the media. The ratings produced by the AME 104 may be used by advertisers and/or marketers to purchase advertising space and/or design advertising campaigns. Additionally or alternatively, the ratings produced by the AME 104 are used by media producers and/or distributors to determine how to set prices for advertising space and/or make programming decisions.

The household 102 of the illustrated example includes an STB 110, a media presentation device 112, and members 114, 116, 118. The STB 110 of the illustrated example converts source signals into media that is presented via the media presentation device 112. In some examples the household 102 is representative of many other households (e.g., representative of other non-panelist households). Characteristics of the other households (e.g., a number of household members, demographics of the household members, a number of televisions, etc.) may be similar to and/or different from those of the representative household 102. For example, other households include one member, two members, three members, four members, etc.

In some examples, the STB 110 implements a digital video recorder (DVR) and/or a digital versatile disc (DVD) player. In the illustrated example, the STB 110 is in communication with the media presentation device 112 via a wireless connection (e.g., Bluetooth, Wi-Fi, etc.) or via wired connection (e.g., Universal Serial Bus (USB), etc.) to transmit a converted source signal from the STB 110 to the media presentation device 112. In some examples, the STB 110 is integrated into the media presentation device 112. In the illustrated example, the media presentation device 112 is a television. In alternative examples, the media presentation device 112 is a computer (e.g., a desktop computer, a laptop computer, etc.), a speaker, a stereo, a portable device (e.g., a tablet, a smartphone, etc.), a gaming console (e.g., Xbox One®, Playstation® 4, etc.), an online media presentation device (e.g., Google Chromecast, Roku® Streaming Stick®, Apple TV®, etc.) and/or any other type of media presentation device.

The STB 110 of the illustrated example collects and/or records tuning data associated with tuning events of the STB 110 and/or the media presentation device 112 (e.g., turning the STB 110 on or off, changing the channel presented via the media presentation device 112, increasing or lowering the volume, remaining on a channel for a duration of time, etc.) to monitor media (e.g., television programming, radio programming, movies, songs, advertisements, Internet-based programming such as websites and/or streaming media, etc.) presented by the media presentation device 112. For example, each tuning event of the tuning data 108 is identified by a channel (e.g., ABC, NBC, USA Network, Comedy Central, NBCSports, HGTV, etc.) and a time (e.g., a particular time such as 7:10 A.M. or 8:31 P.M., a predetermined time-period segment such as 7:00-7:15 A.M. or 8:00-8:30 P.M., etc.) associated with the tuning event.

In examples in which the household 102 is a non-panelist household, the data collected and/or recorded by the STB 110 does not include consumption data (e.g., which member 114, 116, 118 of the household 102 is exposed to particular media) or demographics data (e.g., number of household members, age, gender, race, etc.) of the household 102. For example, if the household member 114 is watching "Kitchen Crashers" via the media presentation device 112, the tuning data 108 recorded by the STB 106 indicates that the STB 110 was tuned to HGTV at 7:30 A.M. on Saturday but does not indicate that "Kitchen Crashers" was consumed by the household member 114 or include demographics data of the household member 114 (e.g., white, 47 year-old female, college educated). As such, without additional information (e.g., demographics data, consumption data) of the household 102, the AME 104 may be unable to utilize the tuning data 108 collected from the STB 110 of the household 102 when estimating a composition and/or size of an audience consuming particular media.

From time to time (periodically, aperiodically, randomly, when the STB 110 is filled with data, etc.), the STB 110 communicates the collected tuning data 108 to the AME 104 via the network 106 (e.g., the Internet, a local area network, a wide area network, a cellular network, etc.) via wired and/or wireless connections (e.g., a cable/DSL/satellite modem, a cell tower, etc.).

The AME 104 of the illustrated example utilizes the collected tuning data 108 to estimate household characteristics of the household 102 (e.g., a number of members, demographics of each of the estimated members, a number of television sets, locations of the television sets, etc.). For example, the AME 104 estimates the demographics of the household 102 to measure the composition and size of an audience and, thus, produce ratings of presented media. As illustrated in FIG. 1, the AME 104 includes a tuning event database 120, a panelist database 122, a distribution calculator 124, and a characteristic estimator 126.

The tuning event database 120 of the illustrated example of FIG. 1 receives and stores the tuning data 108 of the household 102 communicated to the AME 104 via the network 106. For example, the tuning event database 120 stores a household (e.g., the household 102), a channel, and a time associated with each tuning event of the tuning data 108.

The panelist database 122 of the illustrated example collects (e.g., via people meters within the panelist households) and/or stores demographics data, consumption data (e.g., viewing data, listening data), and/or other household characteristic data associated with panelist households. Households may be enrolled as a panelist household using any suitable technique (e.g., random selection, statistical selection, phone solicitations, Internet advertisements, surveys, advertisements in shopping malls, product packaging, etc.). The demographics data stored in the example panelist database 122 includes information pertaining to demographic dimensions (e.g., age, gender, age/gender, occupation, salary, race and/or ethnicity, marital status, education, current employment status, etc.) of members of the panelist households. The consumption data stored in the example panelist database 122 includes information pertaining to consumption events (e.g., viewing events, listening events) in which a panelist consumes (e.g., views, listens to) a particular media event (e.g., identified by time and channel). For example, the consumption data identifies panelists that viewed a particular channel at a particular time (e.g., panelists Peter, Bjorn, and John viewed "Behind the Scenes" on VH1 at 11:30 P.M. on Tuesday. Example household characteristic data stored in the panelist database 122 includes demographics data, consumption data and other data such as a number of television sets and their respective positions within the panelist households, a total number of minutes consumed by the panelist households, a number of minutes consumed by the panelist household per predetermined time-period segments, etc.

To estimate the household characteristic of the household 102, the example AME 104 compares the tuning data 108 to corresponding demographic distributions of the panelist households. In the illustrated example, the distribution calculator 124 calculates demographic distributions for respective tuning events of the tuning data 108. A demographic distribution breaks down the demographics data of the panelist database 122 for the panelists who consumed media (e.g., identified by channel and time) associated with a tuning event of the tuning data 108. For example, the demographic distribution calculated by the example distribution calculator 124 identifies a count or percentage of panelists who consumed the media associated with the tuning event are of demographic constraints of interest (e.g., constraints of an age/gender demographic dimension, a race dimension, an income dimension, and/or an education dimension, etc.).

For example, for a tuning event of the tuning data 108 associated with "Premier League Live" on NBCSports at 7:30 A.M. on Sunday, the distribution calculator 124 collects demographics data associated with panelists who viewed the same channel (i.e., NBCSports) at substantially the same time (e.g., 7:32 A.M. on Sunday) and calculates a demographic distribution for those panelists (e.g., 20% are 18-45 year-old females, 40% are 18-45 year-old males, 10% are 46-64 year-old females, 20% are 46-64 year-old males, 5% are 65+ year-old females, and 5% are 65+ year old males). As a result, a demographic distribution represents probabilities or likelihoods that a consumer of media (e.g., one of the members 112, 114, 116 of the household 102) matches particular demographic dimensions of interest. For example, a person who views "Premier League Live" on NBCSports at 7:30 A.M. on Sunday is 20% likely to be 18-45 year-old female, 40% likely to be a 18-45 year-old male, 10% likely to be a 46-64 year-old female, 20% likely to be a 46-64 year-old male, 5% likely to be a 65+ year-old female, and 5% likely to be a 65+ year old male.

Further, the distribution calculator 124 of the AME 104 calculates an average demographic distribution for all consumption events of the panelist households. In some examples, the average demographic distribution is based on all consumption events of the panelist households that occur at substantially the same time as the tuning events of the tuning data 108 but are not necessarily associated with the same channels as the tuning events. In some examples, the average demographic distribution is based on all consumption events of the panelist households irrespective of the tuning events of the tuning data 108 (e.g., the consumption events do not necessarily align with the time and channel of the tuning events).

Based on the tuning data 108, the demographics distributions associated with respective tuning events and/or the average demographics distribution of the panelists, the characteristic estimator 126 estimates household characteristics of the household 102 such as (1) a number of members of the household 102 (e.g., three household members 112, 114, 116) and (2) the demographics of each of the estimated household members (e.g., the demographics of each of the members 112, 114, 116). Thus, to measure a size and composition of media audiences, the characteristic estimator 126 of the example AME 104 analyzes the tuning data 108 of the household 102 and the demographics and consumption data of the panelist households to estimate the household characteristic of the household 102.

In operation, the STB 110 of the household 102 collects the tuning data 108 associated with tuning events of the STB 110 and/or the media presentation device 112 of the household 102. The tuning data 108 is sent to the tuning event database 120 of the AME 104 via the network 106. Based on the tuning events of the tuning data 108, the distribution calculator 124 uses demographics and consumption data stored in the panelist database 124 to calculate the demographic distributions of panelists associated with the respective tuning events of the household 102. The characteristic estimator 126 of the example AME 104 analyzes (e.g., via machine learning such as decision tree ensembles) the tuning data 108 and the demographic distributions to estimate the household characteristic of the household 102.

Figure 2:
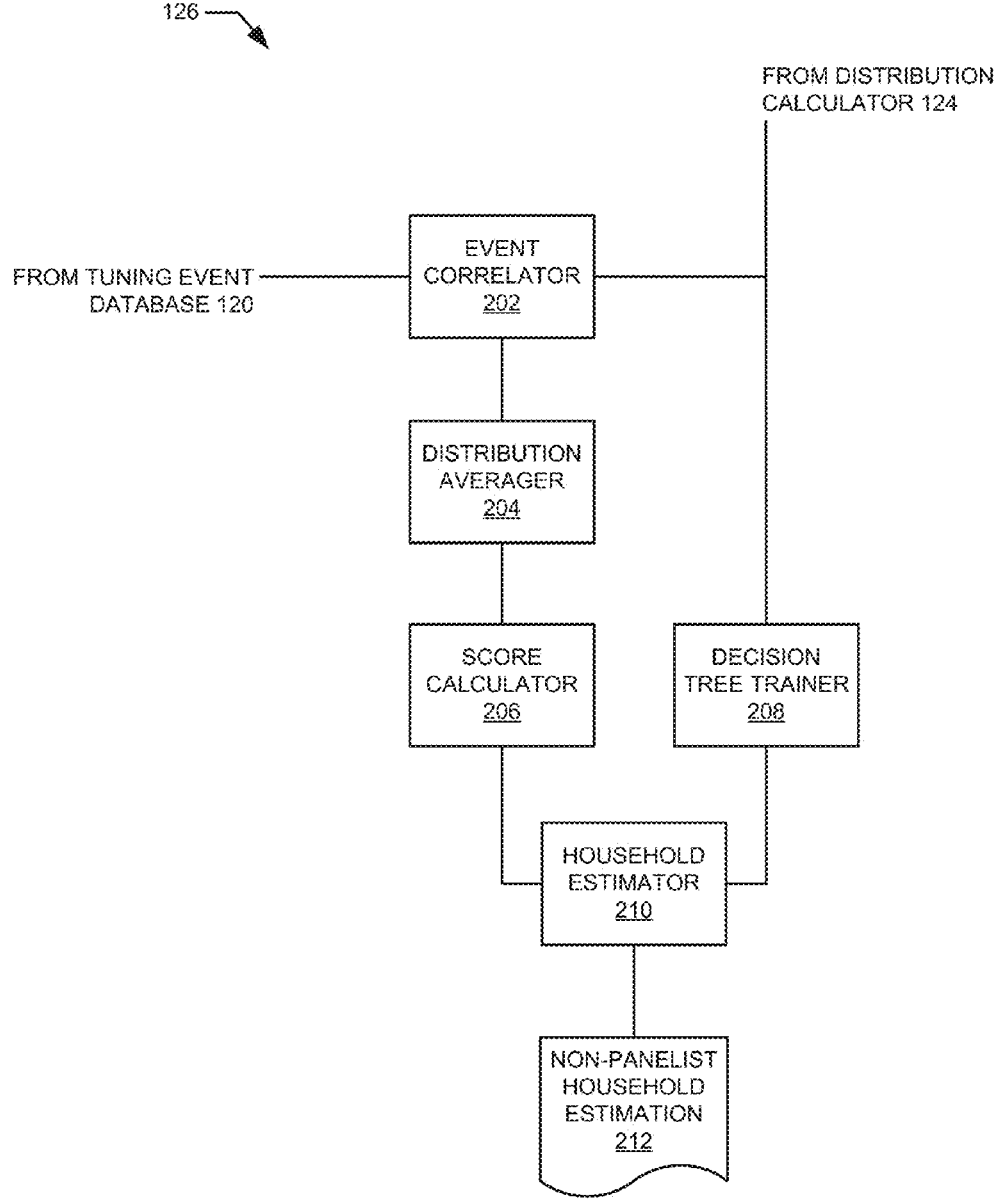
FIG. 2 is a block diagram of an example implementation of the demographic estimator of FIG. 1 that is to estimate the household characteristic of the household of FIG. 1.

FIG. 2 is a block diagram of an example implementation of the characteristic estimator 126 of FIG. 1 that is to estimate the household characteristic of non-panelist households (e.g., the household 102 of FIG. 1). As illustrated in FIG. 2, the example characteristic estimator 126 includes an event correlator 202, a distribution averager 204, a score calculator 206, a decision tree trainer 208, and a household estimator 210.

In the illustrated example, the event correlator 202 collects the tuning data 108 from the example tuning event database 120 of FIG. 1. The event correlator 202 of the illustrated example collects the tuning data 108 of the STB 110 of the household 102 from the tuning event database 120. For example, the tuning data 108 identifies the tuning events by household (e.g., the household 102), channel (e.g., ABC, NBC, USA Network, Comedy Central, etc.), and time (e.g., a particular time such as 7:10 A.M. or 8:31 P.M., a predetermined time-period segment such as 7:00-7:15 A.M. or 8:00-8:30 P.M., etc.). The event correlator 202 of the illustrated example identifies the tuning events associated with the household 102 and identifies the channel and time associated with each tuning event associated with the household. For example, the event correlator 202 identifies that the STB 110 of the household 102 is tuned to HGTV at some point between 5:15 P.M. and 5:30 P.M. and to NBC at some point between 6:00 P.M. and 6:15 P.M.

Upon identifying the tuning events of the tuning data 108 associated with the household 102, the event correlator 202 correlates the tuning events of the tuning data 108 with consumption events of the panelist database 122. The event correlator 202 of the illustrated example correlates the tuning events and the consumption events based on the respective times and channels associated with the tuning and consumption events. For example, the event correlator 202 correlates the tuning events of the household 102 associated with HGTV between 5:15 P.M. and 5:30 P.M. and NBC between 6:00 P.M. and 6:15 P.M. with consumption events of the panelist households associated with HGTV between 5:15 P.M. and 5:30 P.M. and NBC between 6:00 P.M. and 6:15 P.M.

In the illustrated example, the event correlator 202 collects demographic distributions of the panelist households for the consumption events associated with the tuning events of the household 102. An example demographic distribution includes percentages of panelists who satisfy respective demographic constraints of interest and are associated with a corresponding consumption event. For example, the event correlator 202 collects a demographic distribution for panelists associated with a consumption event for HGTV between 5:15 P.M. and 5:30 P.M. and a demographic distribution for panelists associated with a consumption event of NBC between 6:00 P.M. and 6:15 P.M. An example demographic distribution for a consumption event associated with HGTV between 5:15 P.M. and 5:30 P.M. indicates that 15% of panelist viewers are male, 85% of panelist viewers are female, 20% of panelist viewers are young adults, 45% of panelist viewers are middle-aged adults, and 35% of panelist viewers are seniors. An example demographic distribution for a consumption event associated with NBC between 6:00 P.M. and 6:15 P.M. indicates that 45% of panelist viewers are male, 55% of panelist viewers are female, 10% of panelist viewers are young adults, 30% of panelist viewers are middle-aged adults, and 60% of panelist viewers are seniors.

The distribution averager 204 of the illustrated example calculates a demographic distribution average for the household 102. The demographic distribution average includes average percentages for the respective demographic constraints of the demographic distributions associated to the tuning events of the household 102. For example, a demographic distribution average based on the consumption events of HGTV between 5:15 P.M. and 5:30 P.M. and NBC between 6:00 P.M. and 6:15 P.M indicates that 30% of panelist viewers are male, 70% of panelist viewers are female, 15% of panelist viewers are young adults, 37.5% of panelist viewers are middle-aged adults, and 47.5% of panelist viewers are seniors. In other words, a person who is associated with the tuning events of the household 102 is 30% likely to be a male, 70% likely to be a female, 15% likely to be a young adult, 37.5% likely to be a middle-aged adult, and 47.5% likely to be a senior.

Returning to the event coaelator 202 of the illustrated example, the event coaelator 202 collects an average demographic distribution for all media events of the panelist households from the distribution calculator 124. For example, the average demographic distribution collected by the event coaelator 202 includes probabilities of respective demographic constraints being associated with the corresponding consumption event.

In some examples, the average demographic distribution includes probabilities for the demographic constraints based on demographic distributions of all consumption events (irrespective of channel) that occur at the same time as one of the tuning events of the tuning data 108. For example, for a tuning event associated with HGTV between 5:15 P.M. and 5:30 P.M., the average demographic distribution may be based on demographic distributions of the panelist households for consumption events of HGTV between 5:15 P.M. and 5:30 P.M., (i.e., the same channel and the same time as the tuning event) and TNT between 5:15 P.M. and 5:30 P.M. (i.e., a different channel and the same time as the tuning event).

In some examples, the average demographic distribution includes probabilities for the demographic constraints based on demographic distribution of all consumption events irrespective of the tuning events of the tuning event database 120. For example, for a tuning event associated with HGTV between 5:15 P.M. and 5:30 P.M., the average demographic distribution may be based on demographic distributions of the panelist households for viewing events of HGTV between 5:15 P.M. and 5:30 P.M., (i.e., the same channel and the same time as the tuning event), TNT between 5:15 P.M. and 5:30 P.M. (i.e., a different channel and the same time as the tuning event), and FOX between 6:30 P.M. and 6:45 P.M. (i.e., a different channel and a different time as the tuning event).

The score calculator 206 of the illustrated example calculates scores for the respective demographic constraints to account for demographic constraints that consume a disproportionate amount of media. For example, seniors may consume, on average, significantly more media than middle-aged adults and young adults. A distribution average (e.g., 35% of panelists) of a demographic constraint may be less predictive or indicative of a demographic constraint that consumes a disproportionately large amount media on average (e.g. 45% of consumers of all media are seniors) relative to demographic constraints that consumes an average amount or a disproportionately small amount of data (e.g., 27% of consumers of all media are young adults, 28% of consumers of all media are middle-aged adults). Thus, a calculated distribution average of 35% is more predictive or indicative for young adults (by which 27% of all media is consumed) or middle-aged adults (by which 28% of all media is consumed) compared to seniors (by which 45% of all media is consumed).

To account for the disproportionate consumption of media by some demographic constraints, the score calculator 206 calculates scores for the respective demographic constraints. For example, to calculate a score of one of the demographic constraints, the score calculator 206 divides the individual distribution averages of the demographic distribution average (calculated by distribution averager 204) by the respective probabilities of the average demographic distribution (collected by the event correlator 202). For example, based on tuning events associated with HGTV between 5:15 P.M. and 5:30 P.M. and NBC between 6:00 P.M. and 6:15 P.M., the score calculator 206 calculates a score of 0.56 for young adults (e.g., having a 15% distribution average and a probability of 27%), a score of 1.34 for middle-aged adults (e.g., having a 37.5% distribution average and a probability of 28%), and a score of 1.06 for seniors (e.g., having a 47.5% distribution average and a probability of 45%).

The score calculator 206 of the illustrated example constructs a score vector based on the calculated scores. Each element of the score vector represents the calculated score of a respective demographic constraint. In an example score vector, a first element represents a score associated with males (e.g., 0.59), a second element represents a score associated with females (e.g., 1.43), a third element represents a score associated with young adults (e.g., 0.56), a fourth element represents a score associated with middle-aged adults (e.g., 1.34), and a fifth element represents a score associated with seniors (e.g., 1.06).

In some examples, the event correlator 202, the distribution averager 204, and the score calculator 206 are applied to tuning data associated with a plurality of households (e.g., two or more non-panelist households). In such examples, the distribution averager 204 calculates demographic distribution averages for the respective non-panelist households and score calculator 206 constructs score vectors for the respective non-panelist households. For example, the score calculator 206 calculates a score vector for the household 102 and calculates another score vector for another non-panelist household.

The decision tree trainer 208 of the illustrated example utilizes data of the panelist households (e.g., consumption data, demographics data and/or other household characteristic data) to construct decision tree ensembles. The decision tree ensembles are constructed by the decision tree trainer 208 to estimate whether a member of a household satisfies the household features of interest (e.g., demographics constraints). A decision tree ensemble includes a plurality of decision trees that are each associated with the same feature of interest (e.g., household feature of interest) as the other decision trees of the decision tree ensemble. Each decision tree ensemble constructed by the decision tree trainer 208 is associated with a corresponding household feature of interest (e.g., a corresponding demographic constraint of interest) and is constructed independently of the other decision tree ensembles. For example, the decision tree trainer 208 constructs a first decision tree ensemble for the "male" demographic constraint independently of decision tree ensembles constructed for the "female" demographic constraint, the "young adult" demographic constraint, the "middle-aged" demographic constraint, the "senior" demographic constraint, etc. The decision tree ensembles are subsequently applied to data associated with the non-panelist households (e.g., the score vector of the household 102) by the household estimator 210 of the illustrated example to identify household characteristics of the non-panelist households (e.g., number of household members, demographics of the respective household members, etc.).

To construct the decision tree ensembles, the example decision tree trainer 208 constructs score vectors for respective panelist households. For example, the score vectors constructed by the decision tree trainer 208 include scores for the same demographic constraints as those of the score vector constructed by the score calculator 206 for the household 102. The example decision tree trainer 208 constructs the score vectors in a manner similar to that completed for the non-panelist households. For example, to construct the score vectors for the panelist households, the decision tree trainer 208 identifies consumption events of the panelist households, collects demographic distributions for the identified consumption events, averages the demographic distributions, and calculates scores for the demographic constraints.

Further, the decision tree trainer 208 of the illustrated example partitions the panelist households into two mutually exclusive groups. The example decision tree trainer 208 utilizes a first group (a training group) of the panelist households to construct and/or train the decision trees ensembles and utilizes a second group (a testing group) of panelist households to test the trained decision tree ensembles. For example, the first group of panelist households includes about 70% of the panelist households and the second group of panelist households includes about 30% of the panelist households.

The decision tree trainer 208 of the illustrated example constructs feature matrices associated with the respective training group and testing group of the panelist households. An example feature matrix constructed by the decision tree trainer 208 includes rows associated respective panelist households and columns associated with respective household features. Some household features associated with columns of example feature matrices include demographic constraints that are associated with respective score vectors. For example, the decision tree trainer 208 constructs a feature matrix to include a first column associated with the "male" demographic constraint, a second column associated with the "female" demographic constraint, a third column associated with the "young adult" demographic constraint, a fourth column associated with the "middle-aged" demographic constraint, a fifth column associated with the "senior" demographic constraint, etc. In such examples, elements of the feature matrix correspond to the respective scores of the score vectors. For example, in the first row of the feature matrix that is associated with the first panelist household, a first element corresponds to the score of the first household associated with the "male" demographic constraint, a second element corresponds to the score of the first household associated with the "female" demographic constraint, a third element corresponds to the score of the first household associated with the "young adults" demographic constraint, etc. Additionally or alternatively, some columns of example feature matrices are associated with other household characteristics (e.g., a total number of minutes consumed by the household, a number of minutes consumed by the household per predetermined time-period segments (e.g. per quarter-hours of the day), a number of STBs within a household, etc.) and/or other data (e.g., a number of demographic joint distributions associated with the demographic constraints).

Further, to construct the decision tree ensembles, the example decision tree trainer 208 constructs truth vectors for the respective household features of interest of the training group and the testing group based on known household characteristics (e.g., demographic characteristics) of the panelist households. For example, the decision tree trainer 208 constructs a truth vector associated with the "male" demographic constraint for the training group of the panelist households, another truth vector associated with the "female" demographic constraint for the training group, another truth vector associated with the "male" demographic constraint for the testing group, and another truth vector for the "female" demographic constraint for the testing group.

The truth vectors constructed by decision tree trainer 208 include known values (e.g., known by the AME 104 of FIG. 1) for the household features (e.g., demographic constraints) of interest. For an example truth vector associated with the "male" demographic constraint, the decision tree trainer 208 constructs a first element to indicate a known number of male members of a first panelist household, a second element to indicate a known number of male members of a second panelist household, a third element to indicate a known number of male members of a third panelist household, etc. In some examples, the known values of the panelist households are collected when the households are enrolled as panelists via, self-reporting to the AME 104, responding to surveys, consenting to the AME 104 to obtain demographics data from database proprietors (e.g., Facebook, Twitter, Google, Yahoo!, MSN, Apple, Experian, etc.), etc.

The decision trees of the decision tree ensembles constructed by the decision tree trainer 208 include a plurality of decision nodes. Each node represents a decision from which branches extend to subsequent nodes. Each branch represents a potential outcome of the decision associated with the preceding node. An end node at a series of branches of a decision tree represents a potential result or outcome of the decision tree. For example, a decision tree associated with the "male" demographic constraint includes end nodes that each indicates a likelihood that a member of a household is male.

To construct a decision tree of a decision tree ensemble, the decision tree trainer 208 of the illustrated example selects a decision node that provides a greatest amount of variance of outcomes. In some examples, a decision node selected by the decision tree trainer 208 is associated with a household characteristic (e.g., a demographic constraint). An example decision node is associated with the "female" demographic constraint, the "young adult" demographic constraint, etc. In some examples, a decision node selected by the decision tree trainer 208 is associated with other household features (e.g., a total number of minutes consumed by the household, a number of minutes consumed by the household per quarter-hours of the day, etc.) and/or other data (e.g., a number of demographic marginals associated with the demographic constraints). Subsequent decision nodes of the branches are selected by the decision tree trainer 208 until a threshold of the nodes of the decision tree is satisfied. For example, the decision tree trainer 208 selects nodes for a decision tree until a minimum leaf size, tree depth, parent size, etc. is reached. The last nodes selected by the decision tree trainer 208 are the end nodes that provide the outcomes of the constructed decision tree.

To train the decision tree ensembles associated with the respective household features of interest, the decision tree trainer 208 utilizes the constructed feature matrix and truth vectors associated with the training group of the panelist households. For example, to train a decision tree ensemble associated with the "male" demographic constraint, the decision tree trainer 208 utilizes the data of the training group feature matrix and the training group truth vector associated with the "male" demographic profile. The decision tree trainer 208 of the illustrated example constructs the decision tree ensembles such that when data of the training group feature matrix is applied to the decision tree ensembles, the results of the decision tree ensembles substantially match, satisfy, and/or equal the values of the corresponding truth vectors. For example, the decision tree trainer 208 trains the decision tree ensemble associated with the "male" demographic constraint so that application of the training group feature matrix substantially matches, satisfies, and/or equals the truth vector associated with the "male" demographic constraint.

Subsequently, the decision tree trainer 208 tests the constructed decision tree ensembles on the testing group panelist households to determine whether the decision tree ensembles are able to be accurately applied to households on which they were not trained. For example, the decision tree trainer 208 applies the constructed decision trees to the data of the testing group feature matrix to determine whether the results substantially match, satisfy, and/or equal the corresponding testing group truth vectors. If the results are unsatisfactory, the decision tree trainer 208 reconstructs the training groups and testing groups, reconstructs the decision tree ensembles based on the reconstructed training group, and tests the reconstructed decision tree ensembles on the reconstructed testing group. The decision tree trainer 208 reconstructs the decision tree ensembles associated with the household features of interest until the results substantially match, satisfy, and/or equal the truth vectors of the testing group.

The household estimator 210 of the illustrated example applies the decision tree ensembles constructed by the decision tree trainer 208 to the data associated with the household 102 to estimate the household characteristic of the household 102. For example, the household estimator 210 constructs a feature matrix associated with the non-panelist households. In the illustrated example, the feature matrix constructed by the household estimator 210 includes a row associated with the household 102 and columns associated with respective household features. In some examples, the household estimator 210 constructs the feature matrix with additional rows associated with other non-panelist households identified in the tuning data 108. Some columns of the non-panelist feature matrix are associated with demographic constraints associated with respective score vectors constructed by the score calculator 206. In some examples, the constraints of the non-panelist feature matrix are the same as the constraints of the training group feature matrix and the testing group feature matrix.

For example, the household estimator 210 constructs the non-panelist feature matrix to include a first column associated with the "male" demographic constraint, a second column associated with the "female" demographic constraint, a third column associated with the "young adult" demographic constraint, a fourth column associated with the "middle-aged" demographic constraint, a fifth column associated with the "senior" demographic constraint, etc. In such examples, elements of the feature matrix correspond to the scores of the respective score vectors. For example, in a row of the feature matrix associated with the household 102, a first element corresponds to the score of the household 102 associated with the "male" demographic constraint, a second element corresponds to the score of the household 102 associated with the "female" demographic constraint, a third element corresponds to the score of the household 102 associated with the "young adults" demographic constraint, etc. Additionally or alternatively, some columns of the non-panelist feature matrix are associated with other household features (e.g., a total number of minutes consumed by the household, a number of minutes consumed by the household per predetermined time-period segments (e.g. per quarter-hours of the day), etc.) and/or other data of the panelist households (e.g., a number of demographic marginals associated with the demographic constraints).

Subsequently, the household estimator 210 applies the decision tree ensembles constructed by the decision tree trainer 208 to the non-panelist feature matrix. For example, the household estimator 210 applies a decision tree associated with the "male" demographic constraint to the non-panelist feature matrix, a decision tree associated with the "female" demographic constraint to the non-panelist feature matrix, a decision tree associated with the "young adults" demographic constraint to the non-panelist feature matrix, etc.

By applying the decision trees of the respective decision tree ensembles to the non-panelist feature matrix, the household estimator 210 obtains values associated with likelihoods that the non-panelist households (e.g., the household 102) include members satisfying the corresponding household features of interest. As an example, upon applying the decision tree ensemble associated with the "female" demographic constraint to the non-panelist feature matrix, the household estimator 210 obtains a value associated with a likelihood that the household 102 includes a female member and/or obtains value(s) associated with likelihood(s) that other non-panelist household(s) includes a female member.

The value produced by an example decision tree ensemble is based on values produced from the decision trees of that decision tree ensemble. In some examples, the value produced by the decision tree ensemble is an average of the values produced by the respective decision trees of the decision tree ensemble. In some examples, the value produced by the decision tree ensemble is a product of the decision trees of the decision tree ensemble iteratively modifying the value. For example, to produce the value of the decision tree ensemble, a first decision tree of the decision tree ensemble produces a value, a second decision tree modifies the value produced by the first decision tree, a third decision tree modifying that value, etc.

While the household estimator 210 of the illustrated example utilizes a decision tree ensemble to estimate household characteristics of the household 102, alternative examples of the household estimator 210 utilize other forms of machine learning (e.g., neural networks, support vector machines, clustering, Bayesian networks, etc.) to estimate the demographics of the household 102. In such examples, the decision tree trainer 208 and/or another machine learning trainer constructs the corresponding machine learning classifier (e.g., neural networks, support vector machines, a clustering mechanism, Bayesian networks) utilized to estimate the demographics of the household 102.

The household estimator 210 of the illustrated example compares the values obtained from the decision tree ensembles to corresponding thresholds. For example, the household estimator 210 compares the values obtained from the decision tree ensemble associated with the "young adults" demographic constraint to a threshold associated with the same constraint. If the value obtained from the decision tree satisfies the threshold (e.g., is greater than or equal to the threshold value), the household estimator 210 identifies that the non-panelist household includes the corresponding household feature. For example, the household estimator 210 identifies that the household 102 includes a female if the value obtained from the decision tree ensemble associated with the "female" demographic constraint for the household 102 is greater than or equal to the threshold associated with the same demographic constraint. Some example threshold values are static such that the threshold values do not change over time. Some example threshold values are adaptive or dynamic such that the threshold values change over time. For example, some such dynamic threshold values are adjusted via a training process similar to that employed by the decision tree trainer 208 to train the decision tree ensembles.

After the values of the decision tree ensembles are compared to the respective thresholds, the household estimator 210 produces a non-panelist household estimation 212 that estimates which household features (e.g., demographic constraints) are present in the respective non-panelist households. For example, the non-panelist household estimation 212 produced by the household estimator 210 includes an estimation as to whether the household 102 includes a male, a female, a young adult, a middle-aged adult, a senior, etc. Further, in some examples, the household estimator 210 utilizes the identified the household features associated with the non-panelist households to estimate a number of members within the respective non-panelist households. Thus, the non-panelist household estimation 212 includes an estimation of a number of members for the respective non-panelist households. For example, the household estimator 210 utilizes the thresholded values to estimate that the household 102 includes three members (e.g., the members 114, 116, 118). Additionally or alternatively, the non-panelist household estimation 212 produced by the household estimator 210 includes an estimation of a number of television sets within the non-panelist households and a location of the estimated television sets within the household.

While an example manner of implementing the characteristic estimator 126 of FIG. 1 is illustrated in FIG. 2, one or more of the elements, processes and/or devices illustrated in FIG. 2 may be combined, divided, re-arranged, omitted, eliminated and/or implemented in any other way. Further, the example event correlator 202, the example distribution averager 204, the example score calculator 206, the example decision tree trainer 208, the example household estimator 210 and/or, more generally, the example characteristic estimator 126 of FIG. 2 may be implemented by hardware, software, firmware and/or any combination of hardware, software and/or firmware. Thus, for example, any of the example event coaelator 202, the example distribution averager 204, the example score calculator 206, the example decision tree trainer 208, the example household estimator 210 and/or, more generally, the example characteristic estimator 126 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example event coaelator 202, the example demographic averager 204, the example score calculator 206, the example decision tree trainer 208, the example household estimator 210, and/or the characteristic estimator 126 is/are hereby expressly defined to include a tangible computer readable storage device or storage disk such as a memory, a digital versatile disk (DVD), a compact disk (CD), a Blu-ray disk, etc. storing the software and/or firmware. Further still, the example characteristic estimator 126 of FIG. 1 may include one or more elements, processes and/or devices in addition to, or instead of, those illustrated in FIG. 2, and/or may include more than one of any or all of the illustrated elements, processes and devices.

Figure 3:
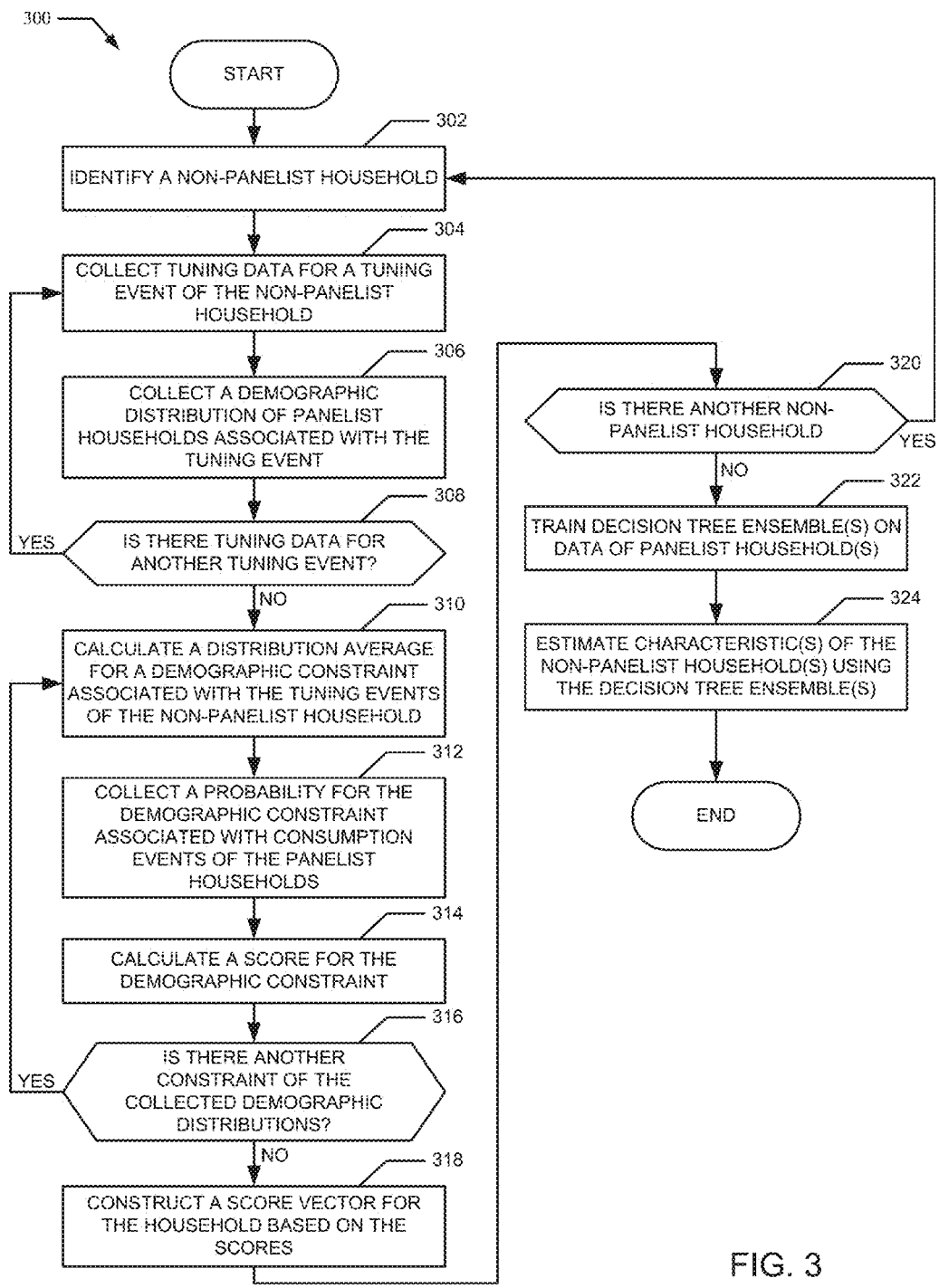
FIG. 3 is a flow diagram representative of example machine readable instructions that may be executed to implement the example demographic estimator of FIGS. 1 and 2 to estimate the household characteristic of the household of FIG. 1.
Figure 4:
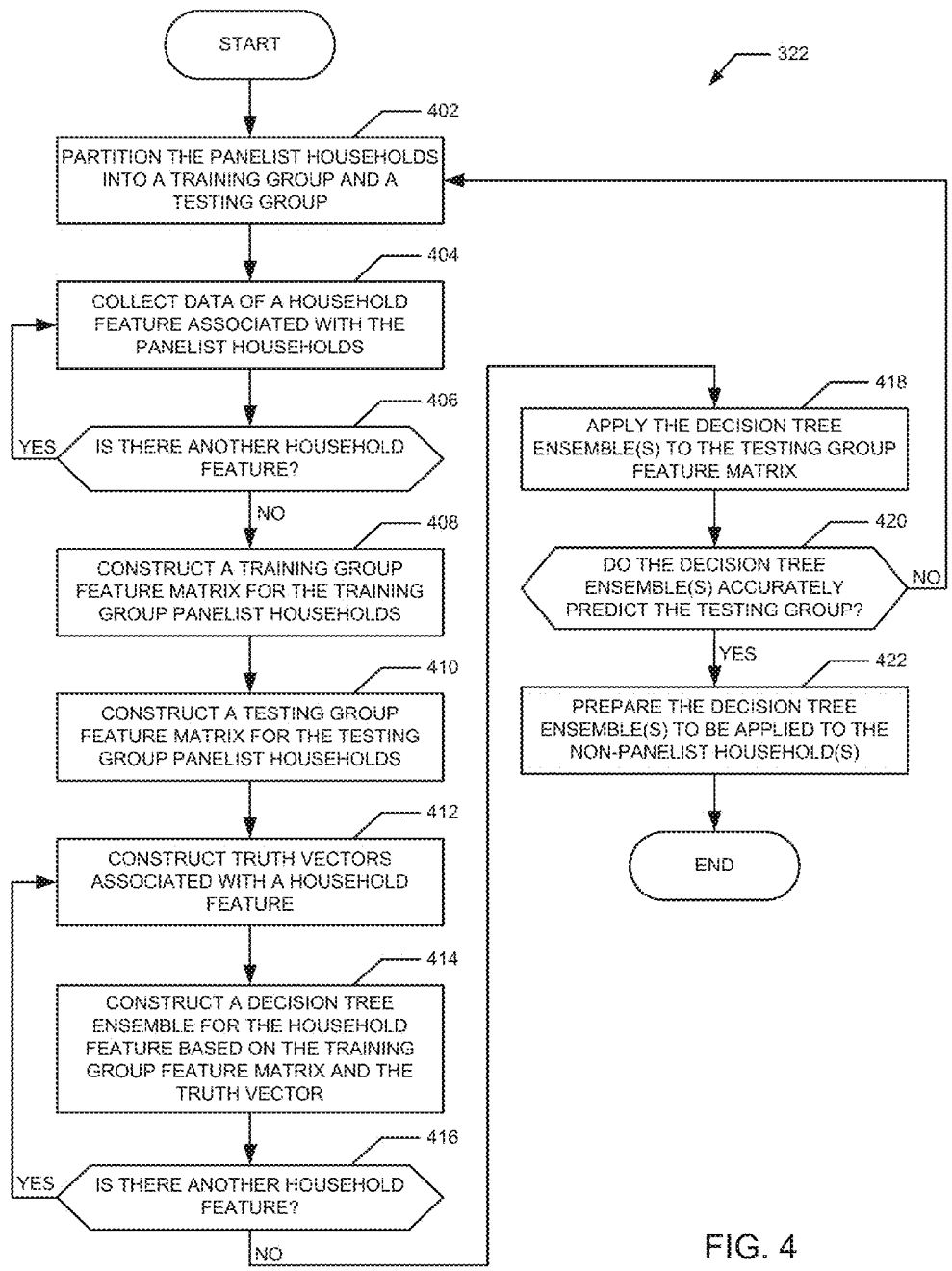
FIG. 4 is a flow diagram representative of example machine readable instructions that may be executed to implement the example decision tree trainer of FIG. 2 to train decision tree ensembles for estimating the household characteristic of the household of FIG. 1.
Figure 5:
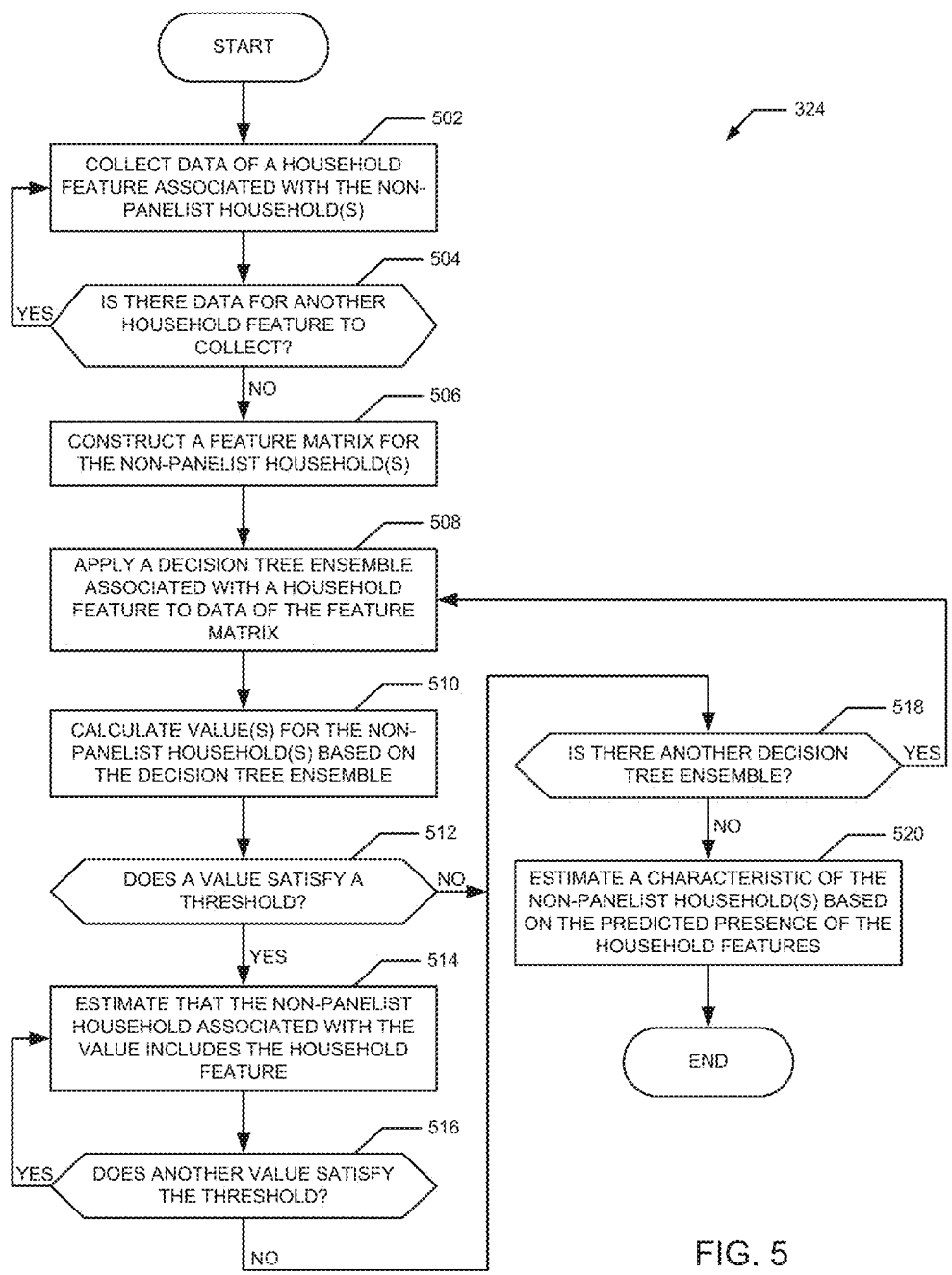
FIG. 5 is a flow diagram representative of example machine readable instructions that may be executed to implement the example house estimator of FIG. 2 to estimate the household characteristic of the household of FIG. 1.

A flowchart representative of example machine readable instructions for implementing the characteristic estimator 126 of FIG. 2 is shown in FIG. 3. A flowchart representative of example machine readable instructions for implementing the household estimator 210 of the characteristic estimator 126 of FIG. 2 is shown in FIG. 4. A flowchart representative of example machine readable instructions for implementing the decision tree trainer 208 of the characteristic estimator 126 of FIG. 2 is shown in FIG. 5. In this example, the machine readable instructions comprise a program for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example programs are described with reference to the flowcharts illustrated in FIGS. 3-5, many other methods of implementing the example characteristic estimator 126 may alternatively be used. For example, the order of execution of the blocks may be changed, and/or some of the blocks described may be changed, eliminated, or combined.

As mentioned above, the example processes of FIGS. 3-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is a flow diagram representative of example machine readable instructions 300 that may be executed to implement the characteristic estimator 126 of FIG. 2 to estimate household characteristics of non-panelist households (e.g., the household 102 of FIG. 1). Initially, at block 302, the event correlator 202 identifies a non-panelist household. For example, the event correlator 202 identifies the household 102 as a non-panelist household that has consented to providing the tuning data 108 recorded by the STB 110 of the household 102 to the AME 104. In other words, the event correlator 202 identifies the household 102 at block 302, because the household 102 has not consented to providing personalized information (e.g., consumption data, demographics data and/or other household characteristic data) as a panelist household but has consented to providing tuning data (e.g., the tuning data 108) as a non-panelist household.

At block 304, the event correlator 202 collects tuning data for a tuning event of the non-panelist household. For example, the event correlator 202 collects the tuning data 108 (FIG. 1) from the tuning event database 120 (FIG. 1) indicating that the STB 110 (FIG. 1) of the household 102 was tuned to HGTV between 5:00 P.M. and 5:15 P.M. At block 306, the event correlator 202 collects a demographic distribution of panelist households associated with the tuning event. For the example tuning event of the household 102 associated with HGTV between 5:00 P.M. and 5:15 P.M., the event correlator 202 collects a demographic distribution from the distribution calculator 124 (FIG. 1) indicating that 15% of panelists associated with the tuning event are male, 85% of panelists associated with the tuning event are female, 20% of panelists associated with the tuning event are young adults, 45% of panelists associated with the tuning event are middle-aged adults, and 35% of panelists associated with the tuning event are seniors.

At block 308, upon collecting the tuning data of the non-panelist households and the corresponding demographic associated with panelist households, the event correlator 202 determines if there is tuning data for another tuning event associated with the non-panelist household to obtain. If there is other tuning event(s), blocks 304, 306, 308 are repeated until the event correlator 202 obtains the tuning data and the corresponding demographic distribution for all other tuning events. For example, tuning data and a corresponding demographic distribution is obtained for tuning events of the household 102 associated with NBC between 6:00 P.M. and 6:15 P.M., NBC between 6:15 P.M. and 6:30 P.M., NBCSports between 7:00 P.M. and 7:15 P.M., NBCSports between 7:15 P.M. and 7:30 P.M., USA Network between 9:00 P.M. and 9:15 P.M., USA Network between 9:15 P.M. and 9:30 P.M., Comedy Central between 10:00 P.M. and 10:15 P.M., Comedy Central between 10:15 P.M. and 10:30 P.M., and NBC between 10:30 P.M. and 10:45 P.M.

At block 310, the distribution averager 204 calculates a distribution average for a demographic constraint associated with the tuning events of the non-panelist household. For example, the distribution averager 204 calculates a distribution average of 46% for the "male" demographic distribution for the household 102. At block 312, the event correlator 202 collects a probability for the demographic constraint associated with consumption events of the panelist households. For example, the event correlator 202 collects data indicating that 51% of consumptions events of the panelist households are associated with male panelists. At block 314, the score calculator 206 calculates a score associated with the demographic constraint for the non-panelist household based on the calculated distribution average and the collected probability. For example, the score calculator 206 calculates a score of 0.90 for the "male" demographic distribution for the household 102. At block 316, the event correlator 202 determines if there is another tuning event for which to calculate a score. If there is another tuning event, blocks 310, 312, 314, 316 are repeated until no other tuning events remain. At block 318, the score calculator 208 constructs a score vector for the non-panelist household (e.g., the household 102) based on the calculated score(s) of the non-panelist household.

At block 320, the event correlator 202 determines if there are tuning events stored in the tuning event database 122 associated with other non-panelist households. If there is another non-panelist household, blocks 302, 304, 306, 308, 310, 312, 314, 316, 318, 320 are repeated until no other non-panelist households remain.

At block 322, the decision tree trainer 208 trains decision tree ensemble(s) associated with respective household characteristic(s) using consumption data, demographic data, and/or other household characteristic data of the panelist households. For example, the decision trainer 208 trains a decision tree ensemble associated with the "male" demographic constraint, trains a decision tree ensemble associated with the "female" demographic constraint, trains a decision tree ensemble associated with the "young adults" demographic constraint, trains a decision tree ensemble associated with the "middle-aged adults" demographic constraint, and trains a decision tree ensemble associated with the "seniors" demographic constraint. Alternatively, at block 322, the decision tree trainer 208 and/or another machine learning trainer may construct a machine learning classifier other than a decision tree classifier (e.g., neural networks, support vector machines, a clustering mechanism, Bayesian networks) based on the data of the panelist households.

At block 324, the household estimator 210 estimates household characteristics (e.g., demographics) of the non-panelist household(s) (e.g., the non-panelist household estimation 212) using the decision tree ensembles constructed at block 322. For example, at block 324, the household estimator 210 applies the decision tree ensemble(s) associated with the household characteristic(s) of interest to the non-panelist feature matrix to determine if a member of the household 102 satisfies any of the respective household characteristic(s). Alternatively, at block 324, the household estimator 210 estimates the household characteristics of the non-panelist households based on a machine learning classifier other than a decision tree classifier (e.g., neural networks, support vector machines, a clustering mechanism, Bayesian networks) that was constructed at block 322.

FIG. 4 is a flow diagram representative of example machine readable instructions 322 that may be executed to implement the decision tree trainer 206 of FIG. 2 to train decision tree ensembles for estimating the household characteristics of the non-panelist households (e.g., the household 102). At block 402, the decision tree trainer 208 partitions the panelists into a training group and a testing group that are mutually exclusive from one another. For example, the decision tree trainer 208 includes about 70% of the panelist households in the training group and includes about 30% of the panelist households in the testing group.

At block 404, the decision tree trainer 208 collects data (e.g., demographic data, consumption data, and/or other household characteristic data, etc.) associated with a household feature for feature matrices associated with the panelist household(s). For example, the decision tree trainer 208 collects data associated with the "female" demographic constraint from score vectors of respective panelist households. At block 406, the decision tree trainer 208 determines if there is another household feature for which to collect data. If the decision tree trainer 208 determines that there is another household feature, blocks 404, 406 are repeated until no other household features remain. For example, the decision tree trainer 208 collects data associated with other demographic constraint of interests (e.g., "males," "young adults," "middle-aged adults," "seniors," etc.) from the score vectors of the respective panelist households. In some examples, the decision tree trainer 208 collects data associated with a number of demographic marginals associated with the demographic constraints and/or other household characteristic data such as a total number of minutes consumed by the household and a number of minutes consumed by the household per predetermined time-period segments (e.g. per quarter-hours of the day).

At block 408, the decision tree trainer 408 constructs a training group feature matrix for the training group panelist households based on the data collected at block 404. For example, the decision tree trainer 208 constructs the training group feature matrix to include rows associated with the respective panelist households of the training group and to include columns associated with respective household features of interest. In such examples, elements of the training group feature matrix are values associated with the corresponding panelist households and the corresponding household features.

At block 410, the decision tree trainer 408 constructs a testing group feature matrix for the testing group panelist households based on the data collected at block 404. For example, the decision tree trainer 208 constructs the testing group feature matrix to include rows associated with the respective panelist households of the testing group and to include columns associated with respective household features of interest. In such examples, elements of the testing group feature matrix are values associated with the corresponding panelist households and the corresponding household features.

At block 412, the decision tree trainer 208 constructs truth vectors associated with a household feature. For example, the decision tree trainer 208 constructs a truth vector associated with the household feature for the training group of panelist households and constructs a truth vector associated with the household feature for the testing group of panelist households. As an example, the decision tree trainer 208 constructs a first truth vector associated with the "female" demographic constraint for the training group of the panelist households and a second truth vector associated with the "female" demographic constraint for the testing group. The truth vectors constructed by decision tree trainer 208 at block 412 include known values of the panelist households for the household features of interest.

At block 414, the decision tree trainer 208 constructs a decision tree ensemble for the household feature based on the training group feature matrix and the training group truth vector associated with the household feature. For example, to train a decision tree ensemble associated with the "male" demographic constraint, the decision tree trainer 208 utilizes the data of the training group feature matrix and the training group truth vector associated with the "male" demographic profile. The decision tree trainer 208 constructs the decision tree ensemble at block 414 such that when data of the training group feature matrix is applied to the "male" decision tree ensemble, the results of the "male" decision tree ensemble substantially match, satisfy, and/or equal the values of the "male" training group truth vector.

At block 416, the decision tree trainer 208 determines if there is another household feature for which to construct a decision tree ensemble. If the decision tree trainer 208 determines that there is another household feature, blocks 412, 414, 416 are repeated until no other household features remain. For example, blocks 412, 414, 416 are repeated by the decision tree trainer 208 to construct a "female" decision tree ensemble, a "young adult" decision tree ensemble, a "middle-aged adult" decision tree ensemble, a "senior" decision tree ensemble, etc.

At block 418, the decision tree trainer 208 applies the constructed decision tree ensembles to the feature matrix of the testing group. As a result, the decision tree trainer 208 obtains estimations from the decision tree ensembles as to whether the respective household features are present in the panelist households of the testing group.

At block 420, the decision tree trainer 208 determines whether the decision tree ensembles accurately estimate the household characteristics of the panelist households of the testing group. For example, the decision tree trainer 208 compares the results of the decision tree ensembles to the testing group truth vectors to determine whether the results substantially match, satisfy, and/or equal the corresponding testing group truth vectors. If the decision tree ensembles do not accurately estimate the household characteristics of the testing group, blocks 402, 404, 406, 408, 410, 412, 414, 416, 418, 420 are repeated. If the decision tree ensembles accurately estimate the household characteristics of the training group, the decision tree tester 208 prepares the decision tree ensembles to be applied to the non-panelist household(s) at block 422.

FIG. 5 is a flow diagram representative of example machine readable instructions 324 that may be executed to implement the house estimator 210 of FIG. 2 to estimate the household characteristics (e.g., demographics) of the non-panelist households (e.g., the household 102 of FIG. 1). At block 502, the household estimator 210 collects data of a household feature associated with the non-panelist household(s) (e.g., the household 102). In some examples, the household estimator 210 collects scores associated with the demographic constraints from the score vectors calculated by the score calculator 206. For example, the household estimator 210 collects a score associated with the "male" demographic constraint from the score vector associated with the household 102 and collects a score associated with the "male" demographic constraint from a score vector associated with another non-panelist household.

At block 504, the household estimator 210 determines if there is data for other household features to collect. If there is another constraint, blocks 502, 504 are repeated until no other constraints remain. For example, the household estimator 210 collects data from the score vectors for other demographic constraints such as "females," "young adults," "middle-aged adults," "seniors," etc. In some examples, the household estimator 210 collects data for other household features (e.g., a total number of minutes consumed by the household, a number of minutes consumed by the household per predetermined time-period segments (e.g. per quarter-hours of the day, etc.) and/or other data associated with the non-panelist households (e.g., a number of demographic marginals associated with the demographic constraints).

At block 506, the household estimator 210 constructs a feature matrix for the non-panelist household using the data collected at block 502. For example, the household estimator 210 constructs the non-panelist feature matrix to include rows associated with the non-panelist households and columns associated with household features of interest. In such examples, elements of the non-panelist feature matrix are values associated with the corresponding non-panelist household rows and the corresponding household feature columns.

At block 508, the household estimator 210 applies a decision tree ensemble, which was constructed by the decision tree trainer 208 and is associated with a demographic constraint of interest, to the data of the non-panelist feature matrix. For example, the household estimator 210 applies the "male" decision tree ensemble to the non-panelist feature matrix to obtain values indicating likelihoods that the respective non-panelist households (e.g., the household 102) include a male member.

At block 510, the household estimator 210 calculates values for the non-panelist households based on the decision tree ensemble at block 508. For example, at block 510, upon applying the "male" decision tree to the non-panelist feature matrix, the household estimator 210 calculates a value (e.g., a percentage, a fraction, a decimal, etc.) associated with a likelihood that the household 102 includes a male member.

At block 512, the household estimator 210 determines if any of the values calculated at block 510 satisfy a threshold. For example, the threshold is a static or dynamic value associated with the household feature that indicates a non-panelist household includes a member of the corresponding household feature. In some examples, the threshold is satisfied if the value provided by the decision tree ensemble is greater than or equal to the threshold value.

If a value provided by the decision tree ensemble does satisfy the threshold, the household estimator 210, at block 514, estimates that the non-panelist household associated with the value includes the household feature. For example, if the value associated with the household 102 satisfies the threshold associated with the "male" demographic constraint, the household estimator 210 estimates that the household 102 includes a male member. At block 516, the household estimator 210 determines if there is another value obtained from the decision tree ensemble that satisfies the threshold. For example, at block 516, the household estimator 210 identifies whether a value obtained from the "male" decision tree ensemble and associated with another non-panelist household (e.g., a non-panelist household other than the household 102) satisfies the "male" threshold value. If so, blocks 514, 516 are repeated until no other values that satisfy the threshold remain.

If the household estimator 210 identifies that no values satisfy the threshold at block 512 or that no other values satisfy the threshold at block 516, the household estimator 210 determines at block 518 if there is another decision tree ensemble associated with another household feature of interest. For example, the household estimator 210 determines at block 518 whether there is a decision tree ensemble associated with "females," "young adults," "middle-aged adults," "seniors," etc. If there is another decision tree ensemble, the household estimator 210 repeats blocks 502, 504, 506, 508, 510, 512, 514, 516, 518. At block 520, if no other decision tree ensembles remain, the household estimator 210 estimates a household characteristic based on the household features that are estimated to be present in the respective non-panelist households. For example, at block 520, the household predictor 520 estimates a number of members and/or a number of television sets within the household 102.

FIG. 6 illustrates an example table 600 showing the example tuning data 108 that is collected from the set-top box 110 of the household 102 of FIG. 1. In the illustrated example, the table 600 includes rows associated with channels and includes columns associated with time-period segments. For example, row 602a is associated with ABC, row 602b is associated with NBC, row 602c is associated with USA Network, row 602d is associated with Comedy Central, row 602e is associated with NBCSports, and row 602f is associated with HGTV. The columns of the illustrated example represent fifteen minute segments. As an illustrated example, column 604a is associated with a time-period between 5:00 P.M. and 5:15 P.M., column 604b is associated with a time-period between 5:15 P.M. and 5:30 P.M., column 604c is associated with a time-period between 5:30 P.M. and 5:45 P.M., and column 604d is associated with a time-period between 5:45 P.M. and 6:00 P.M.

As illustrated in FIG. 6, tuning events 606a, 606b, 606c, 606d, 606e, 606f, 606g, 606h, 606i, 606j of the household 102 are represented by black blocks within the example table 600. For example, the table 600 indicates that the tuning event 606a is associated with HGTV between 5:15 P.M. and 5:30 P.M., the tuning event 606b is associated with NBC between 6:00 P.M. and 6:15 P.M., the tuning event 606c is associated with NBC between 6:15 P.M. and 6:30 P.M., the tuning event 606d is associated with NBCSports between 7:00 P.M. and 7:15 P.M., the tuning event 606e is associated with NBCSports between 7:15 P.M. and 7:30 P.M., the tuning event 606f is associated with USA Network between 9:00 P.M. and 9:15 P.M., the tuning event 606g is associated with USA Network between 9:15 P.M. and 9:30 P.M., the tuning event 606h is associated with Comedy Central between 10:00 P.M. and 10:15 P.M., the tuning event 606i is associated with Comedy Central between 10:15 P.M. and 10:30 P.M., and the tuning event 606j is associated with NBC between 10:30 P.M. and 10:45 P.M.

FIG. 7 illustrates an example table 700 showing demographic distributions of panelists associated with the tuning events 606a, 606b, 606c, 606d, 606e, 606f, 606g, 606h, 606i, 606j of FIG. 6. In the illustrated example, the table 700 includes columns associated with respective tuning events of the household 102 and includes rows associated with respective demographic constraints of interest.

For example, column 702a represents a demographic distribution of panelists associated with the tuning event 604a, column 702b represents a demographic distribution of panelists associated with the tuning event 604b, column 702c represents a demographic distribution of panelists associated with the tuning event 604c, column 702d represents a demographic distribution of panelists associated with the tuning event 604d, column 702e represents a demographic distribution of panelists associated with the tuning event 604e, column 702f represents a demographic distribution of panelists associated with the tuning event 604f, column 702g represents a demographic distribution of panelists associated with the tuning event 604g, column 702h represents a demographic distribution of panelists associated with the tuning event 604h, column 702i represents a demographic distribution of panelists associated with the tuning event 604i, and column 702j represents a demographic distribution of panelists associated with the tuning event 604j.

In the illustrated example, row 704a represents distribution percentages of the demographic distributions for a "male" demographic constraint, row 704b represents distribution percentages of the demographic distributions for a "female" demographic constraint, row 704c represents distribution percentages of the demographic distributions for a "young adult" demographic constraint, row 704d represents distribution percentages of the demographic distributions for a "middle-aged adult" demographic constraint, and row 704e represents distribution percentages of the demographic distributions for a "senior" demographic constraint.

As illustrated in FIG. 7, elements of the example table 700 correspond to percentages of panelist members associated with respective tuning events that satisfy a respective demographic constraint of interest. For example, element 706a indicates that 45% of panelist members associated with the tuning event 606b of the household 102 are male, element 706b indicates that 30% of panelist members associated with the tuning event 606f of the household 102 are middle-aged adults, and element 706c indicates that 55% of panelist members associated with the tuning event 606h of the household 102 are female.

Figure 8:
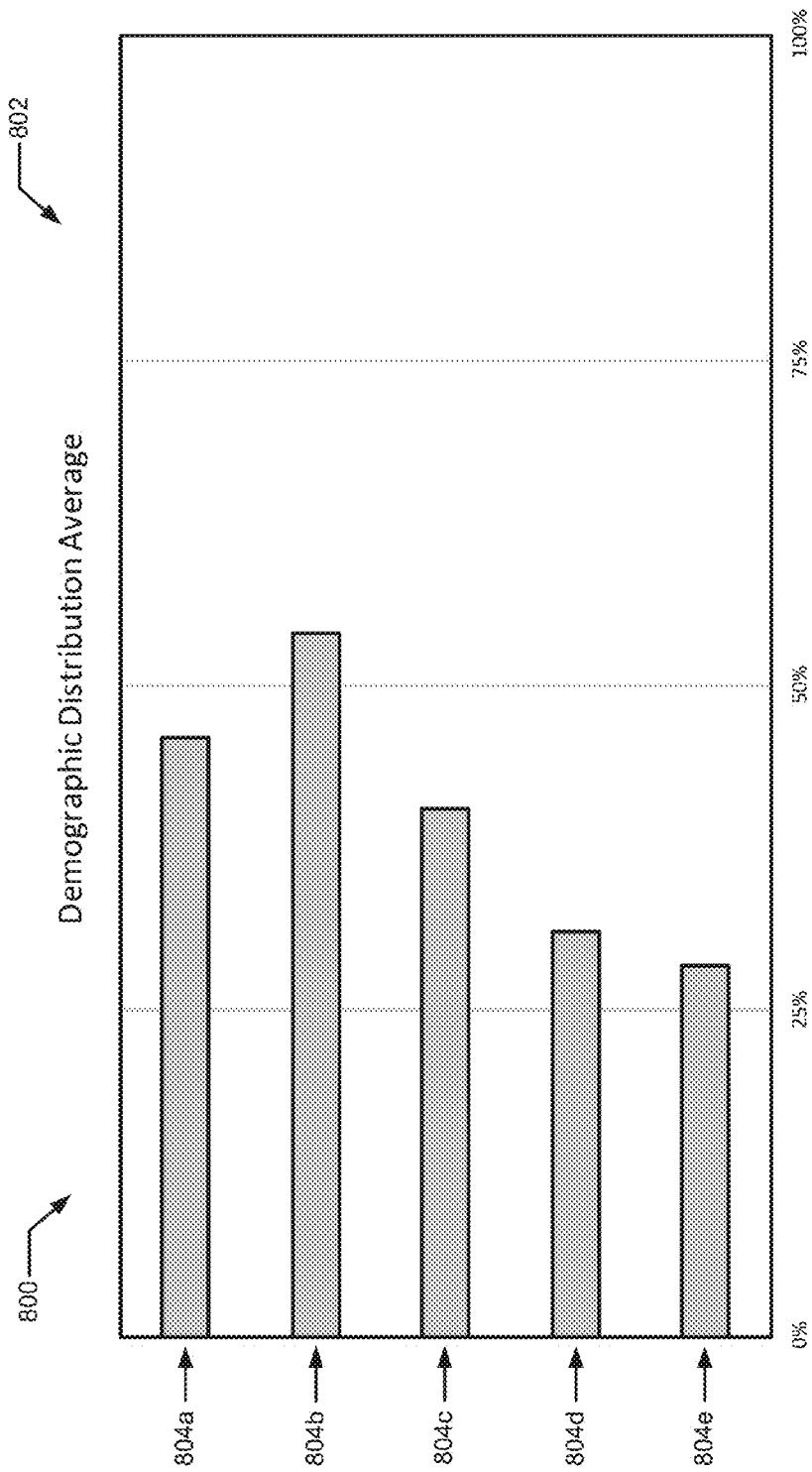
FIG. 8 illustrates an example demographic distribution average that is calculated based on the example demographic distributions of FIG. 7.

FIG. 8 illustrates an example chart 800 showing a demographic distribution average 802 that is calculated based on the demographic distributions 702a, 702b, 702c, 702d, 702e, 702f, 702g, 702h, 702i, 702j of FIG. 7. As illustrated in FIG. 8, the demographic distribution average 802 includes a "male" demographic average 804a, a "female" demographic average 804b, a "young adult" demographic average 804c, a "middle-aged adult" demographic average 804d, and a "senior" demographic average 804e. In the illustrated example, the "male" demographic average 804a is 46.0%, the "female" demographic average 804b 54.0%, the "young adult" demographic average 804c is 40.5%, the "middle-aged adult" demographic constraint 804d is 31.0%, and the "senior" demographic constraint 804e is 28.5%.

Figure 9:
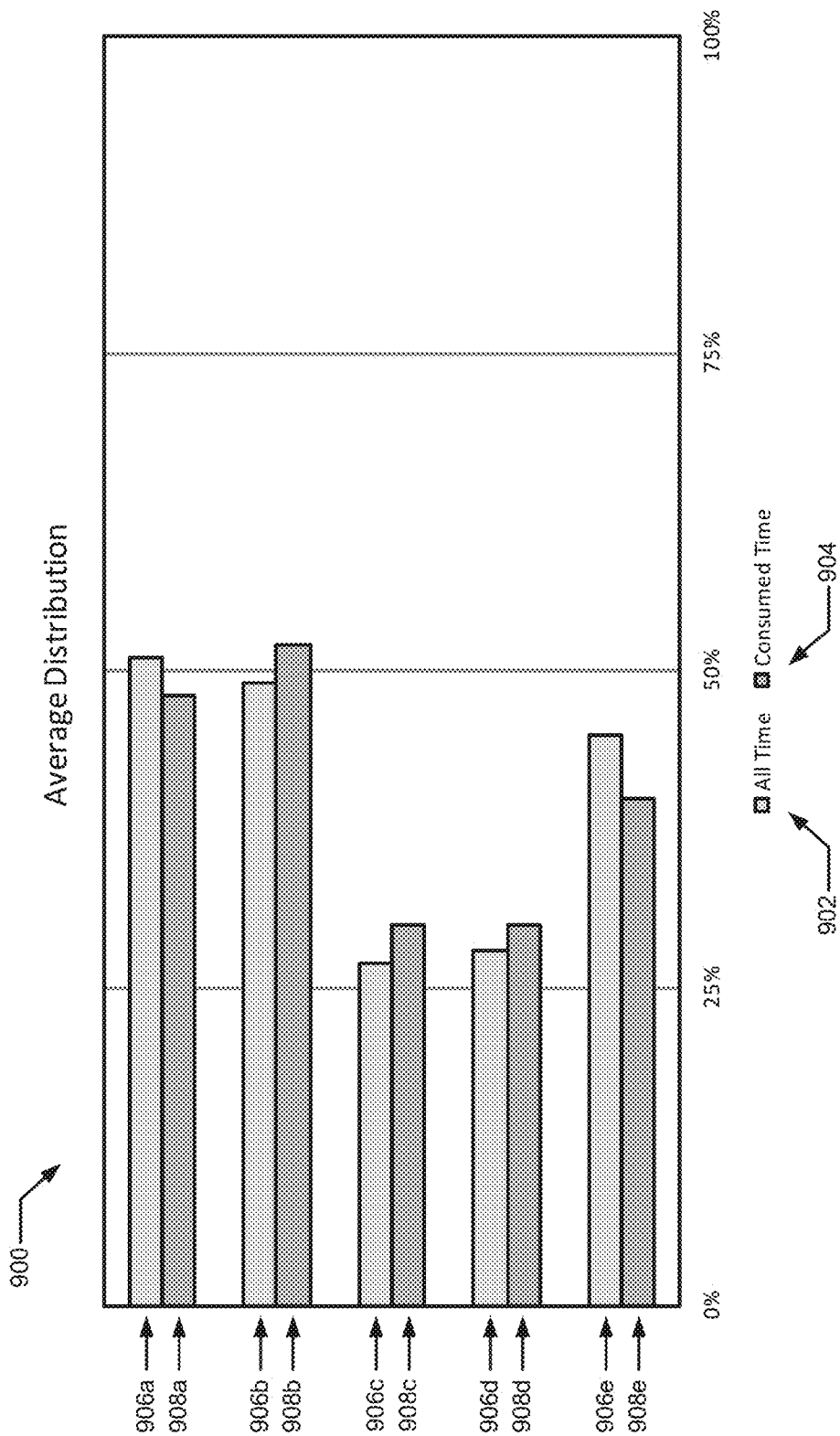
FIG. 9 illustrates example average demographic distributions for consumption events of panelist households.

FIG. 9 illustrates an example chart 900 showing average demographic distributions for consumption events of panelist households. In the illustrated example, an average demographic distribution 902 is based on all consumption events of the panelist households irrespective of channel that occur at substantially the same time as the tuning events 606a, 606b, 606c, 606d, 606e, 606f, 606g, 606h, 606i, 606j of the household 102. An alternative average demographic distribution 904 of the illustrated example is based on all consumption events of the panelist households irrespective of time and channel relative to the tuning events 606a, 606b, 606c, 606d, 606e, 606f, 606g, 606h, 606i, 606j of the household 102.

As illustrated in FIG. 9, the average demographic distribution 902 includes a probability 906a of 51% for the "male" demographic constraint, a probability 906b of 49% for the "female" demographic constraint, a probability 906c of 27% for the "young adult" demographic constraint, a probability 906d of 28% for the "middle-aged adult" demographic constraint, and a probability 906e of 45% for the "senior" demographic constraint. The average demographic distribution 904 of the illustrated example includes a probability 908a of 48% for the "male" demographic constraint, a probability 908b of 52% for the "female" demographic constraint, a probability 908c of 30% for the "young adult" demographic constraint, a probability 908d of 30% for the "middle-aged adult" demographic constraint, and a probability 908e of 40% for the "senior" demographic constraint.

Figure 10:
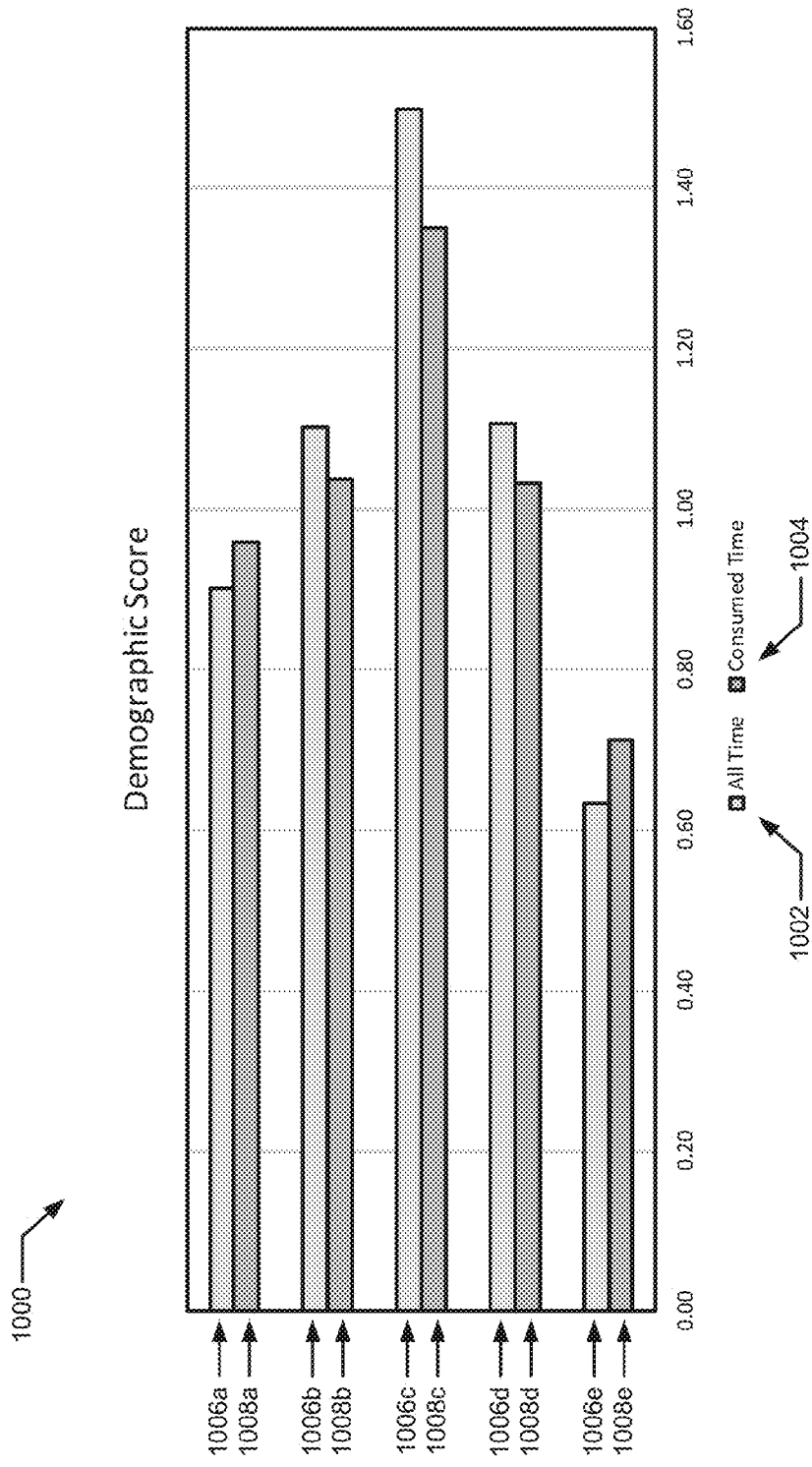
FIG. 10 illustrates demographic constraint scores that are calculated based on the example demographic distribution average for tuning events of FIG. 8 and the example average demographic distributions for consumption events of FIG. 9.

FIG. 10 illustrates an example chart 1000 showing demographic constraint scores that are calculated based on the example demographic distribution average 802 of FIG. 8 and the example average demographic distributions 902, 904 of FIG. 9. For example, a demographic score set 1002 is calculated by dividing the demographic distribution averages 804a, 804b, 804c, 804d, 804e of the demographic distribution average 802 by the corresponding probabilities 906a, 906b, 906c, 906d, 906e of the average demographic distribution 902. A demographic score set 1004 of the illustrated example is calculated by dividing the demographic distribution averages 804a, 804b, 804c, 804d, 804e of the demographic distribution average 802 by the corresponding probabilities 908a, 908b, 908c, 908d, 908e of the average demographic distribution 904.

As illustrated in FIG. 10, the demographic score set 1002 includes a score 1006a of 0.90 for the "male" demographic constraint, a score 1006b of 1.10 for the "female" demographic constraint, a score 1006c of 1.50 for the "young adult" demographic constraint, a score 1006d of 1.11 for the "middle-aged adult" demographic constraint, and a score 1006e of 0.63 for the "senior" demographic constraint. The demographic score vector 1004 of the illustrated example includes a score 1008a of 0.96 for the "male" demographic constraint, a score of 1008b of 1.04 for the "female" demographic constraint, a score 1008c of 1.35 for the "young adult" demographic constraint, a score 1008d of 1.03 for the "middle-aged adult" demographic constraint, and a score 1008e of 0.71 for the "senior" demographic constraint.

Figure 11:
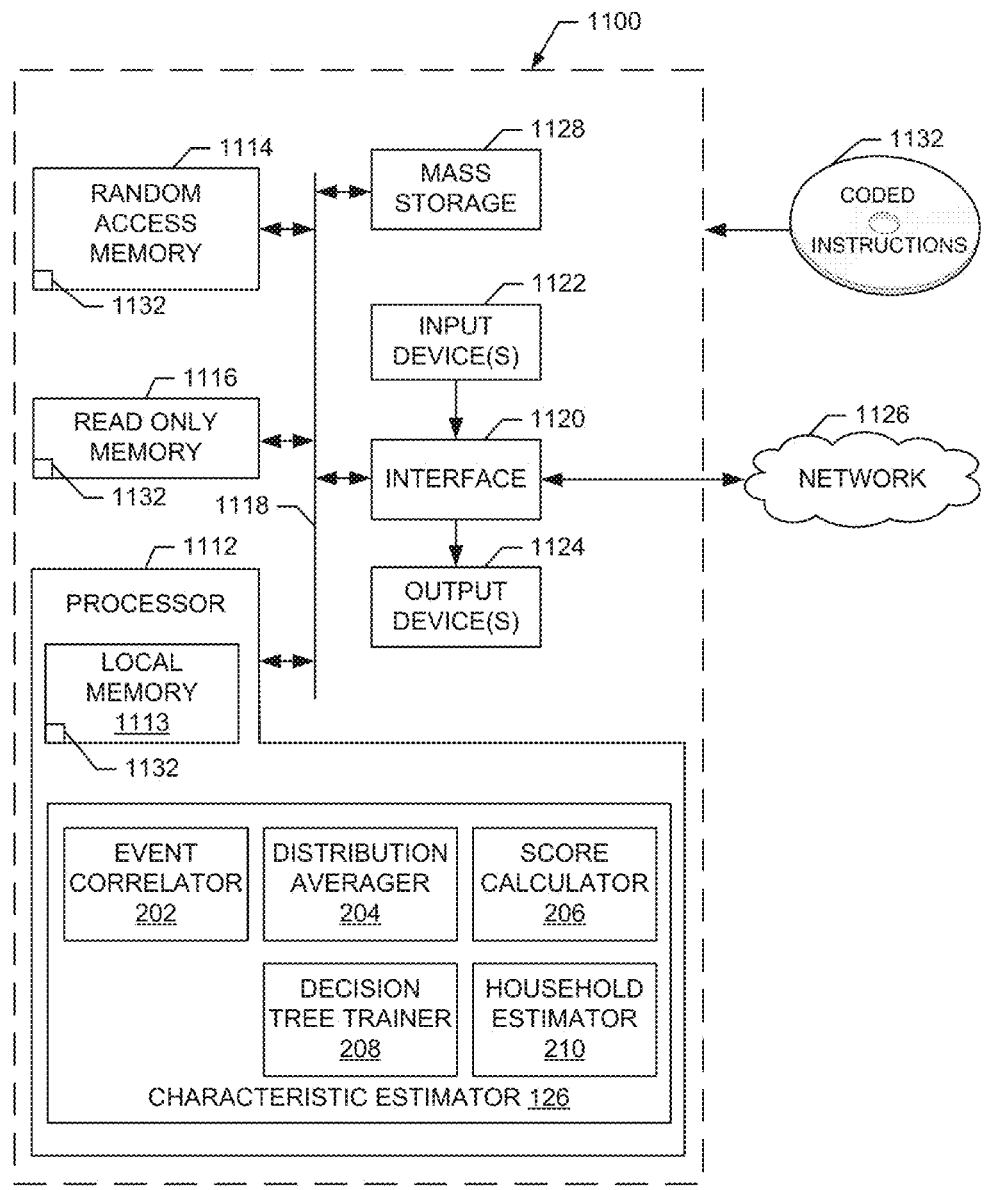
FIG. 11 is a block diagram of an example processor system structured to execute the example machine readable instructions represented by FIGS. 3, 4 and/or 5 to implement the demographic estimator of FIGS. 1 and/or 2.

FIG. 11 is a block diagram of an example processor platform 1100 structured to execute the instructions of FIGS. 3-5 to implement the characteristic estimator 126 of FIG. 2. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The processor 1112 of the illustrated example includes the event correlator 202, the demographic averager 204, the score calculator 206, the decision tree trainer 208, the household estimator 210 and, more generally, the characteristic estimator 126.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

Coded instructions 1132 of FIGS. 3-5 may be stored in the mass storage device 1128, in the volatile memory 1114, in the non-volatile memory 1116, and/or on a removable tangible computer readable storage medium such as a CD or DVD.

From the foregoing, it will be appreciated that the above disclosed methods, apparatus and articles of manufacture allow tuning data unassociated with demographics of consumers to be utilized to produce audience measurement information. For example, to produce audience measurement information, the above disclosed methods, apparatus and articles of manufacture estimate the demographics data of non-panelist households based on tuning data of the non-panelist households without collecting consumption data or demographics data associated with the non-panelist households. Thus, the above disclosed methods, apparatus and articles of manufacture reduce an amount of consumption data and demographics data collected from the non-panelist households that would otherwise be required to produce audience measurement information. As a result, the above disclosed methods, apparatus and articles of manufacture reduce an amount of data processed to produce media ratings and, thus, reduce an amount of memory and processing required to audience measurement information.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to determine demographics for non-panelist households, and reduce a quantity of panelist data retrieved from a computer memory, the method comprising:

reducing, by executing an instruction with a processor, the quantity of panelist data retrieved from the computer memory by calculating a first demographic constraint average and a second demographic constraint average in connection with tuning events of non-panelist households, the first and second demographic constraint averages based on (a) acquiring a first quantity of temporally-mapped panelist demographic distribution data occurring during and associated with a first tuning event of a set-top box of a respective one of the non-panelist households and (b) acquiring a second quantity of temporally-mapped panelist demographic distribution data occurring during and associated with a second tuning event of the set-top box of the respective one of the non-panelist households, the first and second tuning events of the non-panelist household reducing a quantity of the first and second temporally-mapped panelist demographic distribution data retrieved from the computer memory, the first quantity of temporally-mapped panelist subset of demographic distribution data including (a) a first probability that the first tuning event is associated with a first demographic constraint and (b) a second probability that the first tuning event is associated with a second demographic constraint, the second quantity of temporally-mapped panelist demographic distribution data including (a) a third probability that the second tuning event is associated with the first demographic constraint and (b) a fourth probability that the second tuning event is associated with the second demographic constraint;

based on the first demographic constraint average and the first probability that the first tuning event is associated with the first demographic constraint, determining, by executing an instruction with the processor, a first likelihood score of the non-panelist household being associated with the first demographic constraint;

based on the second demographic constraint average and the second probability that the first tuning event is associated with the second demographic constraint, determining, by executing an instruction with the processor, a second likelihood score of the non-panelist household being associated with the second demographic constraint;

estimating, by executing an instruction with the processor, a household characteristic of the non-panelist household based on the first likelihood score and the second likelihood score, the household characteristic including a number of members of the non-panelist household; and producing, by executing an instruction with the processor, ratings of presented media for a mixed audience of non-panelist and panelist households based on the household characteristic.

2. The method as defined in claim 1, further including estimating a number of televisions within respective ones of the non-panelist households and locations of the televisions within the respective ones of the non-panelist households.

3. The method as defined in claim 1, further including estimating a demographic of a non-panelist household member.

4. The method as defined in claim 3, wherein the estimating of the demographic of the non-panelist household member includes determining a marginal of a demographic dimension for the non-panelist household member, the demographic dimension including the first demographic constraint and the second demographic constraint.

5. The method as defined in claim 1, further including:
dividing the first demographic constraint average of a first one of the non-panelist households by a first constraint probability of an average demographic distribution for consumption events of panelist households; and
dividing the second demographic constraint average of a second one of the non-panelist households by a second constraint probability of the average demographic distribution of panelist households.

6. The method as defined in claim 1, wherein the estimating of the household characteristic of the non-panelist households is based on at least one of the first and second demographic constraint, a total number of minutes consumed by respective ones of the non-panelist households, or a number of minutes consumed by respective ones of the non-panelist households per predetermined time-period segments.

7. The method as defined in claim 1, further including calculating a score vector based on the first likelihood score and the second likelihood score, the score vector to be applied to a machine learning classifier to estimate the household characteristic.

8. The method as defined in claim 7, wherein the machine learning classifier is a decision tree ensemble.

9. The method as defined in claim 8, further including:
training the decision tree ensemble on consumption data of a first panelist household; and
testing the decision tree ensemble on consumption data of a second panelist household, the second panelist household being different than the first panelist household.

10. The method as defined in claim 1, further including identifying whether at least one of the first likelihood score or the second likelihood score is equal to or greater than a threshold value.

11. An apparatus to determine demographics for non-panelist households, and to reduce a quantity of panelist data retrieved from a computer memory, the apparatus comprising:
a score calculator to:
reduce the quantity of panelist data retrieved from the computer memory by calculating a first demographic constraint average and a second demographic constraint average in connection with tuning events of non-panelist households, the first and second demographic constraint averages based on (a) acquiring a first quantity of temporally-mapped panelist demographic distribution data occurring during and associated with a first tuning event of a set-top box of a respective one of the non-panelist households and (b) acquiring a second quantity of temporally-mapped panelist demographic distribution data occurring during and associated with a second tuning event of the set-top box of the respective one of the non-panelist households, the first and second tuning events of the non-panelist households reducing a quantity of the first and second temporally-mapped panelist demographic distribution data retrieved from the computer memory, the first quantity of temporally-mapped panelist demographic distribution data including (a) a first probability that the first tuning event is associated with a first demographic constraint and (b) a second probability that the first tuning event is associated with a second demographic constraint, the second quantity of temporally-mapped panelist demographic distribution data including (a) a third probability that the second tuning event is associated with the first demographic constraint and (b) a fourth probability that the second tuning event is associated with the second demographic constraint;
based on the first demographic constraint average and the first probability that the first tuning event is associated with the first demographic constraint, determine a first likelihood score of the non-panelist household being associated with the first demographic constraint;
based on the second demographic constraint average and the second probability that the second tuning event is associated with the second demographic constraint, determine a second likelihood score of the non-panelist household being associated with the second demographic constraint;
a household estimator to estimate a household characteristic of the non-panelist household based on the first likelihood score and the second likelihood score, the household characteristic including a number of members of the non-panelist household; and produce ratings of presented media for a mixed audience of non-panelist and panelist households based on the household characteristic.

12. The apparatus as defined in claim 11, wherein the household estimator is to estimate a number of televisions within respective ones of the non-panelist households and locations of the televisions within the respective ones of the non-panelist households.

13. The apparatus as defined in claim 11, wherein the household estimator is to estimate a demographic of a non-panelist household member.

14. The apparatus as defined in claim 13, wherein the household estimator is to determine a marginal of a demographic dimension of the non-panelist household member, the demographic dimension includes the first demographic constraint and the second demographic constraint.

15. The apparatus as defined in claim 11, wherein the score calculator is to:
divide the first demographic constraint average of a first one of the non-panelist households by a first constraint probability of an average demographic distribution for consumption events of panelist households and;
divide the second demographic constraint average of a second one of the non-panelist households by a second constraint probability of the average demographic distribution of panelist households to determine the second likelihood.

16. The apparatus as defined in claim 11, wherein the household estimator is to estimate the household characteristic of the non-panelist households based on at least one of the first and second demographic constraints, a total number of minutes consumed by respective ones of the non-panelist households, or a number of minutes consumed by respective ones of the non-panelist households per predetermined time-period segments.

17. The apparatus as defined in claim 11, wherein the score calculator is to calculate a score vector based on the first likelihood and the second likelihood, and the household estimator is to apply the score vector to a machine learning classifier to estimate the household characteristic.

18. The apparatus as defined in claim 17, wherein the machine learning classifier is a decision tree ensemble.

19. The apparatus as defined in claim 18, further including a decision tree trainer to:
train the decision tree ensemble on consumption data of a first panelist household; and
test the decision tree ensemble on consumption data of a second panelist household, the second panelist household being different than the first panelist household.

20. The apparatus as defined in claim 11, wherein the household estimator is to identify whether at least one of the first likelihood or the second likelihood is equal to or greater than a threshold value.

21. A tangible computer readable storage medium to determine demographics for non-panelist households, and a quantity of panelist data retrieved from a computer memory, the tangible computer readable storage medium comprising instructions which, when executed, cause a machine to at least:
reduce the quantity of panelist data retrieved from the computer memory by calculating a first demographic constraint average and a second demographic constraint average in connection with tuning events of non-panelist households, the first and second demographic constraint averages based on (a) acquiring a first quantity of temporally-mapped panelist demographic distribution data occurring during and associated with a first tuning event of a set-top box of a respective one of the non-panelist households and (b) acquiring a second quantity of temporally-mapped panelist demographic distribution data occurring during and associated with a second tuning event of the set-top box of the respective one of the non-panelist households, the first and second tuning events of the non-panelist households reducing the quantity of the first and second temporally-mapped panelist demographic distribution data retrieved from the computer memory, the first quantity of temporally-mapped panelist demographic distribution data including (a) a first probability that the first tuning event is associated with a first demographic constraint and (b) a second probability that the first tuning event is associated with a second demographic constraint, the second quantity of temporally-mapped panelist demographic distribution data including (a) a third probability that the second tuning event is associated with the first demographic constraint and (b) a fourth probability that the second tuning event is associated with the second demographic constraint;
based on the first constraint average and the first probability that the first tuning event is associated with the first demographic constraint, determine a first likelihood score of the non-panelist household being associated with the first demographic constraint;
based on the second constraint average and the second probability that the first tuning event is associated with the second demographic constraint, determine a second likelihood score of the non-panelist household being associated with the second demographic constraint;
estimate a household characteristic of the non-panelist household based on the first likelihood score and the second likelihood score, the household characteristic including a number of members of the non-panelist household; and
produce ratings of presented media for a mixed audience of non-panelist and panelist households based on the household characteristic.

22. The tangible computer readable storage medium as defined in claim 21, wherein the instructions, when executed, further cause the machine to estimate a number of televisions within respective ones of the non-panelist households and locations of the televisions within the respective ones of the non-panelist households.

23. The tangible computer readable storage medium as defined in claim 21, wherein the instructions, when executed, further cause the machine to estimate a demographic of a non-panelist household member.

24. The tangible computer readable storage medium as defined in claim 23, wherein the instructions, when executed, further cause the machine to determine a marginal of a demographic dimension for the non-panelist household member, the demographic dimension includes the first demographic constraint and the second demographic constraint.

25. The tangible computer readable storage medium as defined in claim 21, wherein the instructions, when executed, further cause the machine to:
divide the first demographic constraint average of a first one of the non-panelist households by a first constraint probability of an average demographic distribution for consumption events of panelist households; and
divide the second demographic constraint average of a second one of the non-panelist households by a second constraint probability of the average demographic distribution of the panelist households to determine the second likelihood.

26. The tangible computer readable storage medium as defined in claim 21, wherein the instructions, when executed, further cause the machine to estimate the household characteristic of the non-panelist households based on at least one of the first and second demographic constraints, a total number of minutes consumed by respective ones of the non-panelist households, or a number of minutes consumed by respective ones of the non-panelist households per predetermined time-period segments.

27. The tangible computer readable storage medium as defined in claim 21, wherein the instructions, when executed, further cause the machine to calculate a score vector based on the first likelihood and the second likelihood, the score vector to be applied to a machine learning classifier to estimate the household characteristic.

28. The tangible computer readable storage medium as defined in claim 27, wherein the machine learning classifier is a decision tree ensemble.

29. The tangible computer readable storage medium as defined in claim 28, wherein the instructions, when executed, further cause the machine to:
   train a decision tree ensemble on consumption data of a first panelist household; and
   test the decision tree ensemble on consumption data of a second panelist household, the second panelist household being different than the first panelist household.

30. The tangible computer readable storage medium as defined in claim 21, wherein the instructions, when executed, further cause the machine to identify whether at least one of the first likelihood or the second likelihood is equal to or greater than a threshold value.

* * * * *